United States Patent [19]

Shigematsu et al.

[11] Patent Number: 5,532,870
[45] Date of Patent: Jul. 2, 1996

[54] OPTICAL FIBER AMPLIFIER AND OPTICAL AMPLIFIER REPEATER

[75] Inventors: Masayuki Shigematsu; Koji Nakazato; Tomonori Kashiwada; Masayuki Nishimura, all of Yokohama, Japan

[73] Assignee: Sumitomo Electric Industries, Ltd., Osaka, Japan

[21] Appl. No.: 346,256

[22] Filed: Nov. 23, 1994

[30] Foreign Application Priority Data

Nov. 24, 1993 [JP] Japan .................................. 5-293440

[51] Int. Cl.$^6$ ................................ H01S 3/00; H01S 3/30
[52] U.S. Cl. ................................................ 359/341; 372/6
[58] Field of Search ................................ 359/341; 372/6

[56] References Cited

U.S. PATENT DOCUMENTS

| | | |
|---|---|---|
| 5,050,949 | 9/1991 | DiGiovanni et al. . |
| 5,111,334 | 5/1992 | Heidemann . |
| 5,115,338 | 5/1992 | DiGiovanni et al. ............... 359/337 |
| 5,131,069 | 7/1992 | Hall et al. . |
| 5,185,814 | 2/1993 | Healey .............................. 385/24 |
| 5,392,153 | 2/1995 | Delavaux .......................... 359/341 |

FOREIGN PATENT DOCUMENTS

| | | |
|---|---|---|
| 0440024 | 8/1991 | European Pat. Off. . |
| 0463771 | 1/1992 | European Pat. Off. . |

OTHER PUBLICATIONS

Eskildsen et al., Optical Power Equalization for Multiwavelength Fiber–Amplifier Cascades Using Periodic Inhomogeneous Broadening, IEEE Photonics Technology Letters, 5 (1993) Oct. vol. 5, No. 10, pp. 1188–1190.

Willner et al., Passive Equalization of Nonuniform EDFA Gain by Optical Filtering for Megameter Transmission of 20 WDM Channels Through a Cascade of EDFA's, IEEE Photonics Technology Letters, 4 (1993) Sep., vol. 5, No. 9, pp. 1023–1026.

Hansen et al, "Gain Tilt of Erbium–Doped Fiber Amplifiers Due to Signal–Induced Inversion Locking", IEEE Photonics Technology Letters, vol. 4, No. 4, Apr. 1993, pp. 409–411.

Kashiwada et al, "Spectral Gain Behavior of Er–Doped Fiber With Extremely High Aluminum Concentration", pp. 104–107.

Atkins et al, "High–Gain, Broad Spectral Bandwidth Erbium–Doped Fiber Amplifier Pumped Near 1.5 μm", Electronics Letters, vol. 25, No. 14, Jul. 1989, pp. 910–911.

Hall et al, "Gain Spectra and Amplifier Enhancement", OFC '94 Technical Digest, Friday Morning, pp. 270–271.

Shigematsu et al, "Distortion–Free Optical Fiber Amplifier for Analog Transmission Based on Hybrid Erbium–Doped fiber Configuration" Affiliated with Sumitomo Electric Industries, Ltd.

Kashiwada et al, "Gain Flattened Optical Fiber Amplifiers for WDM Transmission Employing Hybrid Erbium–Doped Fiber Configuration", Affiliated with Sumitomo Electric Industries, Ltd.

(List continued on next page.)

*Primary Examiner*—Mark Hellner
*Attorney, Agent, or Firm*—Cushman Darby & Cushman

[57] ABSTRACT

An optical fiber amplifier comprises a composite optical fiber for receiving signal light and excitation light, amplifying the signal light and emitting the amplified signal light, comprising at least two kinds of optical fibers serially coupled each having a glass composition selected from at least two kinds of rare-earth-doped glass compositions, and excitation means for generating excitation light and supplying it to the composite optical fiber. Then, an optical fiber amplifier which reduces the wavelength dependency of gain in various wavelength ranges in wavelength division multiplexing transmission or in optical analog transmission, and which maintains an energy efficiency for amplification, an optical fiber amplifier which makes a wavelength at a gain peak to a predetermined one in accordance with intensities of various input lights, and an optical amplifier repeater comprising this optical fiber amplifier are provided.

13 Claims, 20 Drawing Sheets

OTHER PUBLICATIONS

Kuo et al, "Low Distrotion Amplifier analog CATV Transport System", AT&T Bell Laboratories, Breinigsville, PA 18031, pp. 340–342.

Chraplyvy et al, "End-to-End Equalization Experiments in Amplified WDM Lightwave Systems", IEEE Photonics Technology Letters, vol. 4, No. 4, Apr. 1993, pp. 428–429.

Toba et al, "A 100–Channel Optical FDM Six–Stage In–Line Amplifier System Employing Tunable Gain Equalizers", IEEE Photonics Technology Letters, vol. 5, No. 2, Feb. 1993, pp. 248–251.

Marcerou et al, "Basic Comparison Between Fluoride–and Silica–Doped Fiber Amplifiers in the 1550nm Region", MoA2.3, pp. 53–56.

Goldstein et al, "Inhomogeneously Broadened Fiber–Amplifier Cascade for Wavelength–Multiplexed Systems", pp. 45–48.

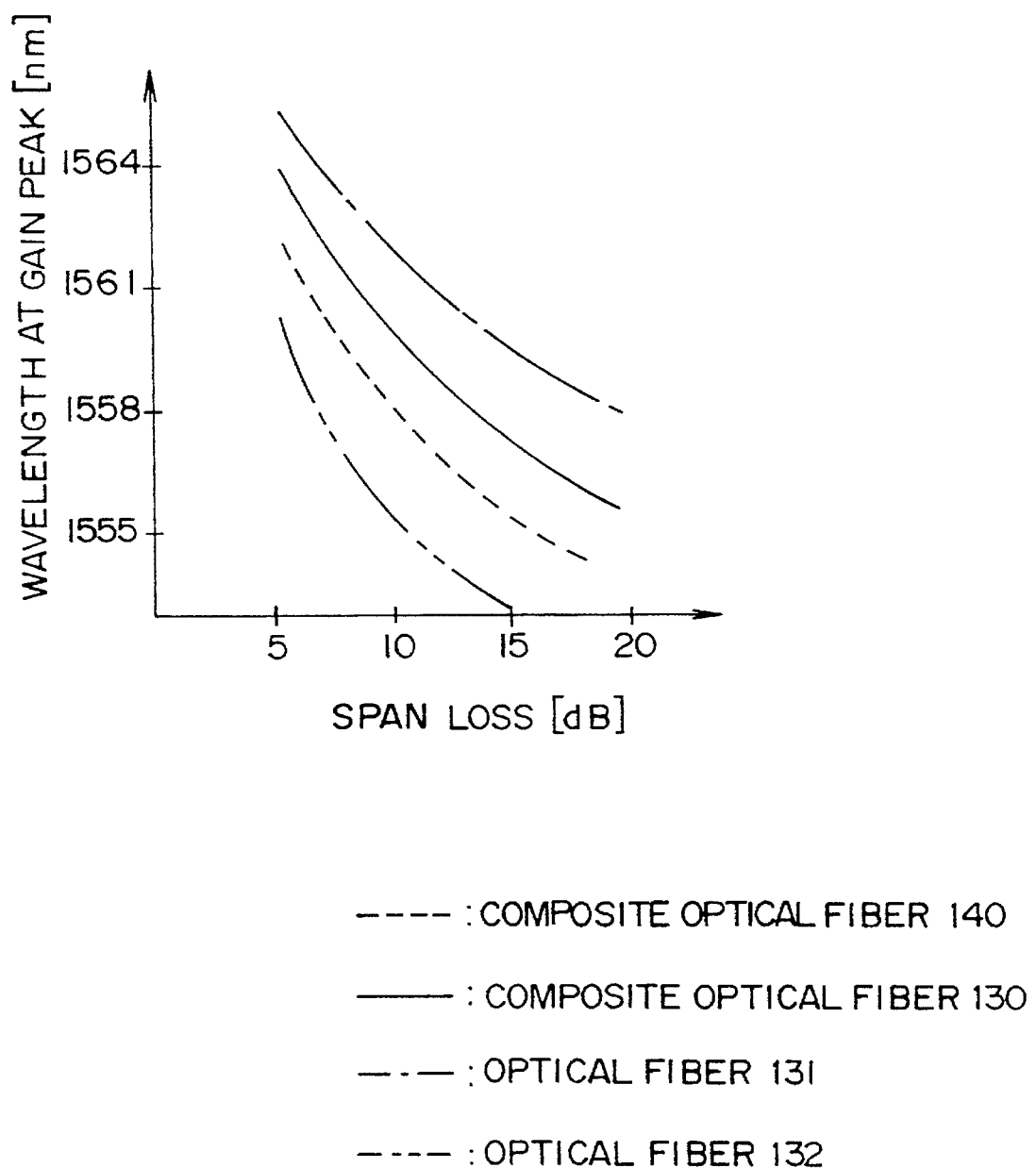

OPTICAL FIBER AMPLIFIER AND OPTICAL AMPLIFIER REPEATER

BACKGROUND OF THE INVENTION

1. Field of the Invention

The present invention relates to an optical fiber amplifier to be utilized in optical communication systems which perform wavelength division multiplexing transmission or optical analog transmission, and to an optical amplifier repeater to be utilized in optical communication lines relayed in multistage.

2. Related Background Art

Optical fiber amplifiers to which dynamic energy is supplied in a form of light and which is for amplifying input signal light and emitting the amplified light are mainly used in optical communication systems. Especially, an optical fiber amplifier using an optical fiber in which a Fare earth element such as Er is doped is superior in high gain and low noise, and utilized in various ways.

In such optical fiber amplifiers, it is known that gain of the rare-earth-doped optical fiber is wavelength dependence. In particular, in the analog optical transmission, the wavelength dependency of the gain hinders the precise amplification of signal light combined with laser chirping used as a transmitter. In order to improve this point, several attempts have been made to reduce the wavelength dependence.

The first example of these attempts is a technique to reduce the wavelength dependency of the gain by co-doping Al in an amplifying Er-doped optical fiber. This technique is reported, e.g., in "C. G. Atkins et al., Electron. Lett., Vol. 14, 1989, pp1062–1064". The second example of the attempts to reduce the wavelength dependence is a technique of shortening the amplifying Er-doped optical fiber. This technique is reported, e.g., in "S. L. Hansen et al., IEEE Photon. Technol. Lett., Vol. 4, No. 4, 1993, pp409–411".

In a case of long-distance digital optical transmission, an optical amplifier repeater comprising an optical fiber amplifier is used to construct a multistage transmission line in order to compensate optical loss due to transmitting optical fibers. In optical amplifier repeaters, signal light is amplified with the optical fiber amplifier but in this optical amplifier repeater, when the signal light is amplified, noise components distributed in a relatively wide wavelength range including a wavelength at a gain peak are added to signal components with transmission wavelengths of signal light. Here, when the wavelength of the signal light substantially matches with the wavelength at the gain peak of the optical amplifier repeater, the signal components are amplified by a higher amplification factor than the noise components. Consequently, discrimination of signal components and noise components is easy even in the transmission line in which the optical amplifier repeaters comprising the same kind of the optical fiber amplifiers are arranged in multistage.

On the other hand, when the transmission wavelength is different from the wavelength at the gain peak, the noise components are amplified by a higher amplification factor than the signal components. Consequently, discrimination of signal components and noise components is difficult in the transmission line in which the optical amplifier repeaters comprising the same kind of the optical fiber amplifiers are arranged in multistage. Therefore, in the optical communication line in which a plurality of optical transmission lines are connected in multistage through the optical amplifier repeaters to relay and amplify the signal light, a transmitting signal is limited substantially to an optical signal with a single wavelength and a wavelength at a gain peak of the optical amplifier repeater is employed as the wavelength of the signal light.

The wavelength dependency of the gain in the gain operation of the amplifying rare-earth-doped optical fiber depends on glass composition of a core and a type of a rare earth element to be doped. Accordingly, there is a limit on decrease of the wavelength dependency of the gain by co-doping Al in high concentration or by shortening the amplifying optical fiber, and there is also a limit on a wavelength range in which the wavelength dependence can be reduced (T. Kashiwada et al., OAA '93, MA6). In the technique of shortening the amplifying optical fiber, there is also a problem that the sufficient gain cannot be attained.

As the countermeasure for these problems, a passive component (e.g., an optical filter) which has the wavelength dependency of insertion loss to cancel out the wavelength dependency of the gain of the optical fiber amplifier is placed at an output of the optical fiber amplifier. However, with this countermeasure, the loss medium is present, which causes the degrade of energy efficiency used for amplification and which finally causes the degrade of amplification efficiency.

In the optical communication line in which the optical amplifier repeaters are arranged in multistage, generally, the transmission loss between each of the adjacent optical amplifier repeaters is different from others because the distance between each of the adjacent optical amplifier repeaters is different from others. In the amplification operation of the amplifying rare-earth-doped optical fiber, the wavelength at the gain peak is varied depending on the intensity of input light to be amplified. Consequently, in order to make the wavelength at the gain peak of every optical amplifier repeater substantially the same, the wavelength at the gain peak needs to be adjusted for every optical amplifier repeater, or the transmission loss between each of the optical amplifier repeaters needs to be fixed. However, the latter has problems that there is a limit on installation of transmitting optical fibers and that large energy for amplification is needed over the communication line.

As the former method, that is, the method to adjust the wavelength at the gain peak of every optical amplifier repeater, (1) adjusting the length of the amplifying optical fiber, and (2) adjusting the composition of the amplifying optical fiber by co-doping Al are known; however, there is a problem in the method (1) that shortening the optical fiber causes degrade of gain and that lengthening the optical fiber causes degrade of noise characteristic. Consequently, it is difficult to independently control the wavelength at the gain peak. The method (2) can control the wavelength at the gain peak without damaging another properties; however, as shown in FIG. 1, the wavelength at the gain peak is sharply varied at 0–0.5 wt % of the Al-codoped concentration, which causes a problem that precisely adjusting the wavelength at the gain peak is difficult in manufacture. Note that when a plurality of the compositions in which the optical amplifier repeater is placed in the latter stage of the communication line are connected in series, the span loss and the relay amplification are sufficiently stable in the latter, and that FIG. 1 shows a relation between the span loss and the wavelength at the gain peak in this stable condition.

SUMMARY OF THE INVENTION

It is an object of the present invention to provide an optical fiber amplifier which reduces wavelength dependency of gain in various wavelength ranges in wavelength division multiplexing transmission or in optical analog transmission, and which maintains an energy efficiency for amplification.

It is also an object of the present invention to provide an optical amplifier repeater comprising an optical fiber amplifier which makes a wavelength at a gain peak to a predetermined one in accordance with intensities of various input lights.

A first type optical fiber amplifier of the present invention is an optical fiber amplifier for amplifying a wavelength-multiplexed optical signal carrying information for each wavelength and comprises (a) a composite optical fiber for receiving signal light and excitation light, amplifying the signal light, and emitting the amplified signal light, comprising a plurality of serially coupled optical fibers having different compositions in which a rare earth element is doped, and (b) excitation means for generating the excitation light and supplying the excitation light to the composite optical fiber, and for light having a plurality of wavelengths and carrying information with the optical signal, a difference of gains of the optical fiber amplifier due to a difference of wavelengths is less than 1 dB.

Here, a composition of each optical fiber of the plurality of the optical fibers is determined in accordance with wavelength dependency of gain measured by simultaneously amplifying lights with a plurality of wavelengths to be simultaneously transmitted to each optical fiber having the same composition as each of the optical fibers.

The excitation means can comprise (a) an excitation light source for generating excitation light, and (b) a directional coupler for receiving excitation light emitted from the excitation light source from a first terminal, and receiving one of the input signal light and light emerged from the composite optical fiber from a second terminal and emitting the excitation light to the composite optical fiber, and the rare earth element in the composite optical fiber is excited with a method selected from forward pumping, backward pumping and bidirectional pumping.

The rare earth element is preferably Er. Here, a difference of compositions of the plurality of the optical fibers is a difference of one of $Al_2O_3$ concentrations, $P_2O_5$ concentrations, Er doping concentrations, included in each optical fiber, and a combination of these concentrations.

A difference between a maximum gain and a minimum gain of the composite optical fiber in a predetermined wavelength range is smaller than a difference between a maximum gain and a minimum gain in the predetermined wavelength when each of the plurality of the optical fibers has the same effective length as the composite optical fiber and receives the same excitation light as the composite optical fiber.

Further, the composite optical fiber can comprise (1) a first optical fiber for receiving and amplifying light in the predetermined wavelength range, a ratio of gain at a predetermined wavelength to a differential coefficient relative to a variation of gain corresponding to a variation of a gain wavelength in the predetermined wavelength being a first value, and (2) a second optical fiber for receiving and amplifying light emerging from the first optical fiber, a ratio of gain at the predetermined wavelength to a differential coefficient relative to a variation of gain corresponding to a variation of a gain wavelength in the predetermined wavelength having an opposite sign and substantially the same absolute value as the first value.

A second type optical fiber amplifier of the present invention is an optical fiber amplifier for amplifying an optical analog signal carrying information with an intensity every moment and comprises (a) a composite optical fiber for receiving signal light and excitation light, amplifying the signal light, and emitting the amplified signal light, comprising a plurality of serially coupled optical fibers having different compositions in which a rare earth element id doped, and (b) excitation means for generating the excitation light and supplying the excitation light to the composite optical fiber, and a rate of change of gain of the optical fiber amplifier due to a variation of a wavelength is below 0.2 dB/nm for a plurality of wavelength components of the optical signal.

Here, a composition of each optical fiber of the plurality of the optical fibers is determined in accordance with wavelength dependency of gain measured as gain relative to a small signal while each of the optical fibers maintains a saturation region.

Further, the excitation means can comprise (a) an excitation light source for generating excitation light, and (b) a directional coupler for receiving excitation light emitted from the excitation light source from a first terminal, and receiving one of the input signal light and light emerged from the composite optical fiber from a second terminal and emitting the excitation light to the composite optical fiber, and the rare earth element in the composite optical fiber is excited with a method selected from forward pumping, backward pumping and bidirectional pumping.

The rare earth element is preferably Er. Here, a difference of compositions of the plurality of the optical fibers is a difference of one of $Al_2O_3$ concentrations, $P_2O_5$ concentrations, Er doping concentrations, included in each optical fiber, and a combination of these concentrations.

A difference between a maximum gain and a minimum gain of the composite optical fiber in a predetermined wavelength range is smaller than a difference between a maximum gain and a minimum gain in the predetermined wavelength when each of the plurality of the optical fibers has the same effective length as the composite optical fiber and receives the same excitation light as the composite optical fiber.

Further, the composite optical fiber can comprise (1) a first optical fiber for receiving and amplifying light in the predetermined wavelength range, a ratio of gain at a predetermined wavelength to a differential coefficient relative to a variation of gain corresponding to a variation of a gain wavelength in the predetermined wavelength being a first value, and (2) a second optical fiber for receiving and amplifying light emerging from the first optical fiber, a ratio of gain at the predetermined wavelength to a differential coefficient relative to a variation of gain corresponding to a variation of a gain wavelength in the predetermined wavelength having an opposite sign and substantially the same absolute value as the first value.

A third type optical fiber amplifier of the present invention is an optical amplifier for amplifying an optical analog signal with a plurality of wavelength components carrying information with an intensity every moment for each wavelength and comprises (a) a composite optical fiber for receiving signal light and excitation light, amplifying the signal light, and emitting the amplified signal light, comprising a plurality of serially coupled optical fibers having different compositions in which a rare earth element is doped, and (b) excitation means for generating the excitation light and supplying the excitation light to the composite optical fiber, and a rate of change of gain of the optical fiber amplifier due to a variation of a wavelength is below 0.2 dB/nm for a plurality of wavelength components of the optical signal.

Here, a composition of each optical fiber of the plurality of the optical fibers is determined in accordance with wavelength dependency of gain measured as gain relative to a small signal while each of the optical fibers maintains a saturation region.

Further, the excitation means can comprise (a) an excitation light source for generating excitation light, and (b) a directional coupler for receiving excitation light emitted from the excitation light source from a first terminal, and receiving one of the input signal light and light emerged from the composite optical fiber from a second terminal and emitting the excitation light to the composite optical fiber, and the rare earth element in the composite optical fiber is excited with a method selected from forward pumping, backward pumping and bidirectional pumping.

The rare earth element is preferably Er. Here, a difference of compositions of the plurality of the optical fibers is a difference of one of $Al_2O_3$ concentrations, $P_2O_5$ concentrations, Er doping concentrations, included in each optical fiber, and a combination of these concentrations.

A difference between a maximum gain and a minimum gain of the composite optical fiber in a predetermined wavelength range is smaller than a difference between a maximum gain and a minimum gain in the predetermined wavelength when each of the plurality of the optical fibers has the same effective length as the composite optical fiber and receives the same excitation light as the composite optical fiber.

Further, the composite optical fiber can comprise (1) a first optical fiber for receiving and amplifying light in the predetermined wavelength range, a ratio of gain at a predetermined wavelength to a differential coefficient relative to a variation of gain corresponding to a variation of a gain wavelength in the predetermined wavelength being a first value, and (2) a second optical fiber for receiving and amplifying light emerging from the first optical fiber, a ratio of gain at the predetermined wavelength to a differential coefficient relative to a variation of gain corresponding to a variation of a gain wavelength in the predetermined wavelength having an opposite sign and substantially the same absolute value as the first value.

A fourth type optical fiber amplifier of the present invention comprises (a) a composite optical fiber for receiving signal light and excitation light, amplifying the signal light, and emitting the amplified signal light, comprising a plurality of serially coupled optical fibers having different compositions in which a rare earth element is doped, a relation between an intensity of input signal light and a wavelength at which gain is the largest being different from a relation between an intensity of input signal light and gain when each of the plurality of the optical fibers has the same effective length as the composite optical fiber and receives the same excitation light as the composite optical fiber, and (b) excitation means for generating the excitation light and supplying the excitation light to the composite optical fiber, and a rate of change of a gain of the optical fiber amplifier due to a variation of a wavelength is below 0.2 dB/nm for a plurality of wavelength components of the optical signal.

Here, the excitation means can comprise (a) an excitation light source for generating excitation light, and (b) a directional coupler for receiving excitation light emitted from the excitation light source from a first terminal, and receiving one of the input signal light and light emerged from the composite optical fiber from a second terminal and emitting the excitation light to the composite optical fiber, and the rare earth element in the composite optical fiber is excited with a method selected from forward pumping, backward pumping and bidirectional pumping.

The rare earth element is preferably Er. Here, a difference of compositions of the plurality of the optical fibers is a difference of one of $Al_2O_3$ concentrations, $P_2O_5$ concentrations, Er doping concentrations, included in each optical fiber, and a combination of these concentrations.

Further, the composite optical fiber can comprise (1) a first optical fiber for receiving signal light having a wavelength in a predetermined wavelength range and excitation light and amplifying the signal light, an intensity of the signal light and a wavelength at which gain is the largest in the predetermined wavelength having a first relation, and (2) a second optical fiber for receiving and amplifying signal light having a wavelength in the wavelength range emerging from the first optical fiber and excitation light, an intensity of the signal light and a wavelength at which gain is the largest in the predetermined wavelength having a second relation different from the first relation.

An optical amplifier repeater can be constructed using the above-described optical fiber amplifiers.

FIG. 2 is a conceptional view of an optical fiber amplifier of the present invention. As shown in FIG. 2, the optical fiber amplifier of the present invention comprises (a) a composite optical fiber in which a plurality of at least two kinds of amplifying rare-earth-doped optical fibers with different glass compositions are connected in series, and (b) excitation means for supplying energy for amplification in a form of excitation light to the composite optical fiber. Here, either of forward pumping, backward pumping, and bidirectional pumping can be employed in the excitation means.

When light with assumed intensity ($I_0$) is incident on the optical fiber amplifier with the above configuration, assuming the gain of each optical fiber is $g_i(\lambda)$, the gain $g(\lambda)$ of the whole optical fiber amplifier is expressed by the following equation.

$$g(\lambda) = \prod_i g_i(\lambda) \quad (1)$$

Consequently, the wavelength dependency $dg(\lambda)/d\lambda$ of the gain $g(\lambda)$ of the whole optical fiber amplifier is expressed by the following equation.

$$\frac{dg(\lambda)}{d\lambda} = \sum_i \left( \frac{dg_i(\lambda)}{d\lambda} \cdot \frac{g(\lambda)}{g_i(\lambda)} \right) \quad (2)$$

$$= g(\lambda) \sum_i \left( \left( \frac{dg_i(\lambda)}{d\lambda} \right) / g_i(\lambda) \right)$$

As shown in the above, the wavelength dependency $dg_i(\lambda)/d\lambda$ of each amplifying optical fiber can be adjusted by controlling the co-doping concentration such as Al, and the gain of each amplifying optical fiber can be adjusted by controlling its length so that the noise property is not degraded or by controlling the rare earth element concentration to be doped. Therefore, if both the composition and the length of each amplifying optical fiber are adjusted, an optical fiber amplifier in which the wavelength dependency of the gain is reduced in a predetermined wavelength range, and an optical fiber amplifier in which a predetermined wavelength at a gain peak can be attained are formed in wavelength division multiplexing transmission or optical analog transmission.

Note that the wavelength dependency of the gain of the optical fiber amplifier, that is, the wavelength of the gain of each amplifying optical fiber varies in accordance with the intensity ($I_0$) of incident light. However, taking the variation of the wavelength dependency of the gain due to glass composition into consideration, to reduce the wavelength dependency, even with the optical fiber amplifier formed with the assumed specified intensity of incident light, the wavelength dependency of the gain can be reduced in the predetermined wavelength range if the intensity of incident light is not largely different from the assumed intensity of incident light. To set a predetermined wavelength at a gain peak in the optical fiber amplifier to be utilized in the optical amplifier repeater, the intensity of incident light can be preset because the transmission loss between each of the optical amplifier repeaters is known at the installation of communication line.

The operations of the first-third optical fiber amplifiers will be explained.

In wavelength division multiplex (WDM) transmission, the wavelength dependency of the gain in a case that lights with a plurality of wavelengths are simultaneously amplified with an optical fiber amplifier in which a rare-earth-doped optical fiber is used (multi-wavelength amplification), is different from the wavelength dependency of the gain in a case that light is amplified for each wavelength (single wavelength amplification). FIG. 3 is a graph showing the wavelength dependency of the gain in the case of the four-wavelength amplification and the wavelength dependency of the gain in the case of the single-wavelength amplification. As seen from FIG. 3, between the wavelength dependency of the gain in the case of the multi-wavelength amplification and the wavelength dependency of the gain in the case of the single-wavelength amplification, not only the gain is different but also the differential coefficient at each wavelength relative to a variation of a gain wavelength. The first type optical amplifier of the present invention is an optical fiber amplifier using a composite optical fiber that rare-earth-doped amplifying optical fibers having at least two kinds of glass compositions with different wavelength dependency of gain are connected in series, base on the evaluation of the wavelength dependency of the gain of the rare-earth-doped optical fibers having various kinds of glass compositions for multi-wavelength amplification, which is performed by the inventors. With this optical fiber amplifier, a difference of the gain relative to wavelengths of lights for wavelength division multiplex transmission is suppressed under 1 dB.

Bidirectional pumping is performed with a composite optical fiber in which a plurality of rare-earth-doped optical fibers are directly coupled with each other without any inclusion, so that each rare-earth-doped optical fiber can sufficiently be excited, and the noise factor can excellently be maintained while the amplifying efficiency is maintained. If a filter, an isolator, or a coupler is provided between each of the rare-earth-doped optical fibers, the amplifying efficiency will be degraded only with the excitation light supplied from the both ends of the composite optical fiber.

In the analog transmission, an amplitude of transmitted light is varied every moment. In this case, it has been known that the wavelength dependency of the gain of an optical fiber amplifier using a rare-earth-doped optical fiber is different from the wavelength dependency of the gain for continuous lights having substantially the same intensity (S. L. Hansen, et al., IEEE Photon, Technol, Lett. Vol. 4, No. 4, 1993, pp409–411). On the other hand, in the single light analog transmission, an optical signal has a wavelength distribution in a small region when a laser diode used as a transmitter is directly modulated. The second type optical fiber amplifier of the present invention is an optical fiber amplifier using a composite optical fiber that rare-earth-doped amplifying optical fibers having at least two kinds of glass compositions with different wavelength dependency of the gain are connected in series, base on the evaluation of the wavelength dependency of the gain of the rare-earth-doped optical fibers having various kinds of glass compositions for small signals while the optical fibers maintain the saturation region (Locked-Inversion (LI)), which is performed by the inventors. In this optical fiber amplifier, a rate of change of the gain of the optical fiber amplifier due to a variation of a wavelength is suppressed below 0.2 dB/nm.

The third type optical fiber amplifier of the present invention is based on the same knowledge as the second type optical fiber amplifier of the present invention, and a rate of change of the gain of the optical fiber amplifier due to a variation of a wavelength is suppressed below 0.2 dB/nm for each wavelength in the wavelength division multiplex transmission.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

FIG. 25 is a graph showing characteristics of an optical amplifier repeater of the sixth embodiment.

DETAILED DESCRIPTION OF THE PREFERRED EMBODIMENTS

Figure 1:
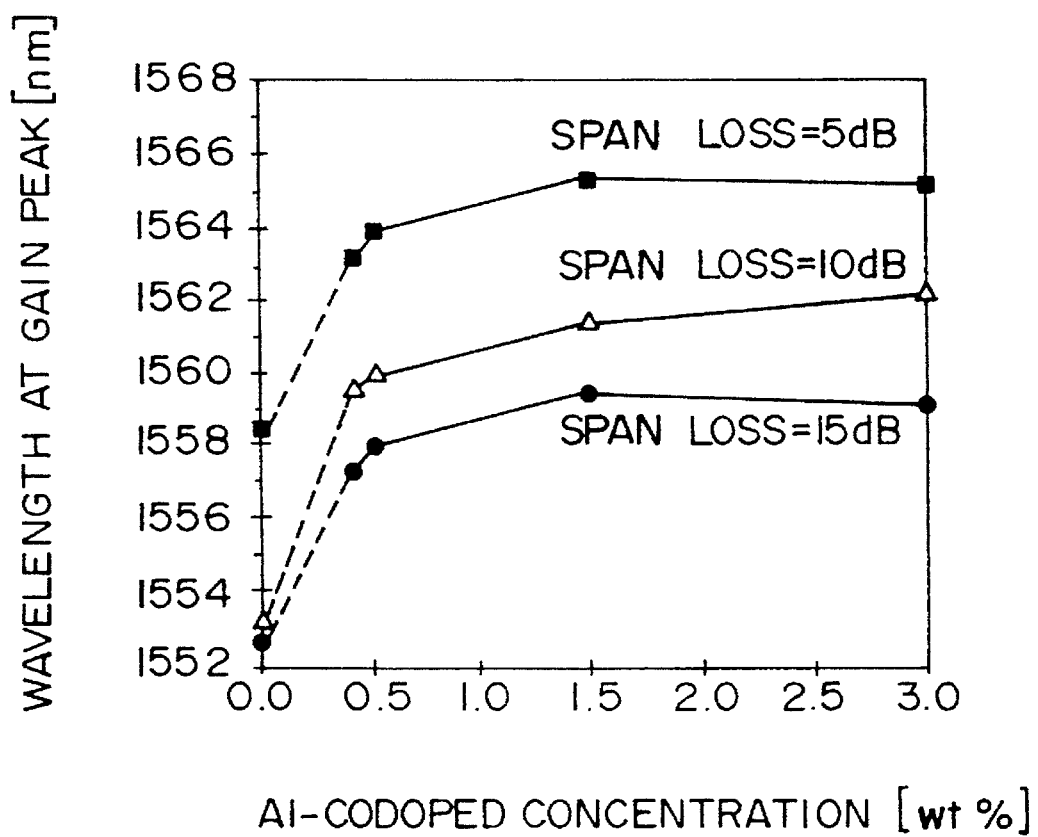
FIG. 1 is a graph showing characteristics of a conventional optical amplifier repeater.
Figure 2:
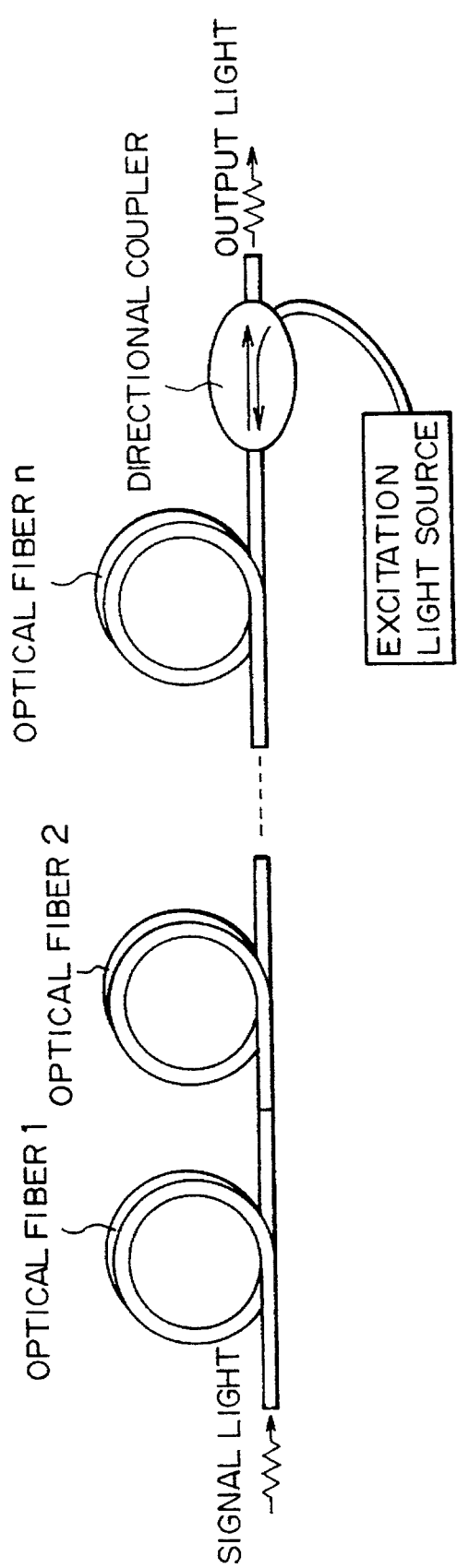
FIG. 2 is a conceptional view showing an optical fiber amplifier of the present invention.
Figure 3:
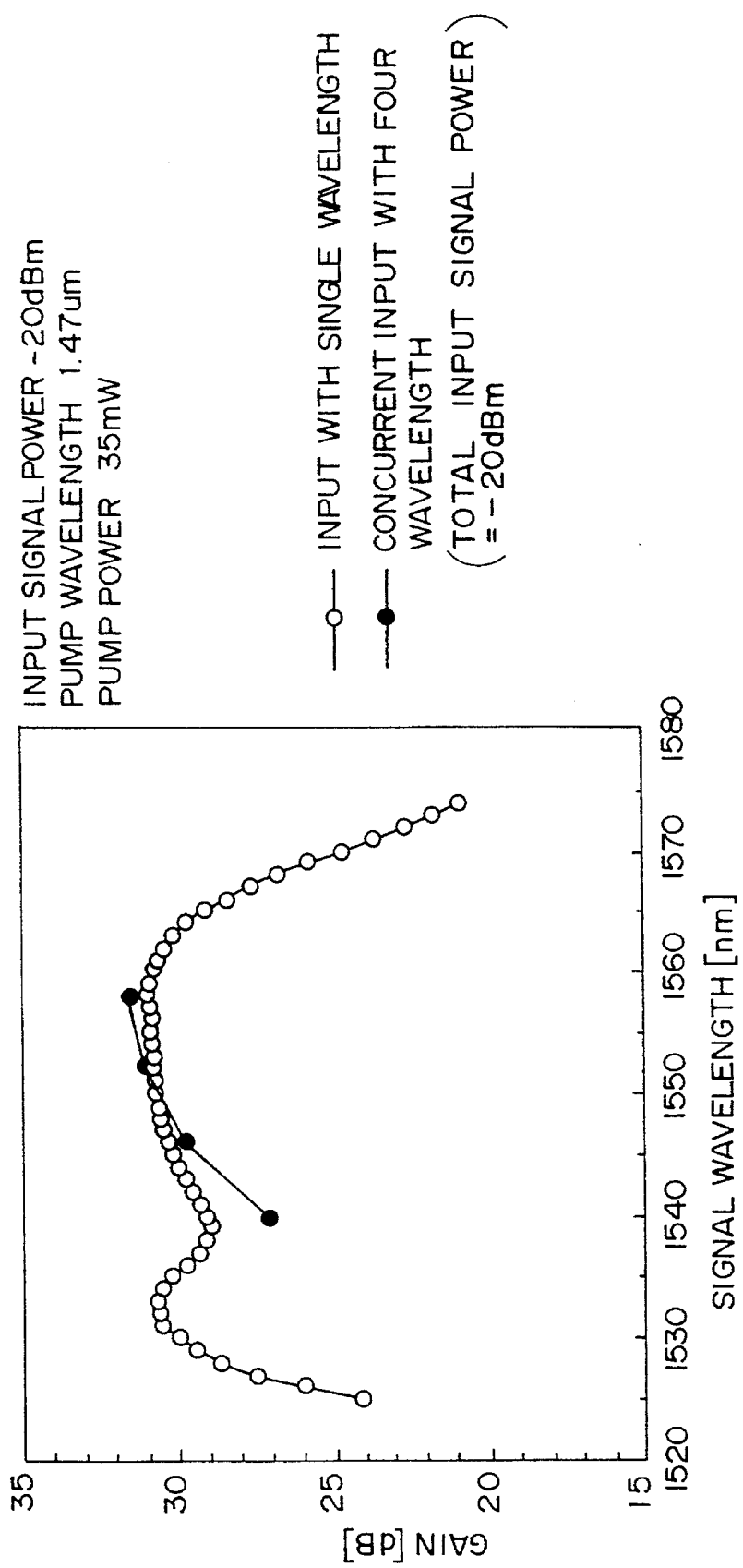
FIG. 3 is a graph showing wavelength dependency of gain in a case of four-wavelength amplification and in a case of single wavelength amplification.

The embodiments of the present invention will be described with reference to the accompanying drawings. In the description of drawings, the same components are represented by the same reference numerals, and the repetitive description on the same component is omitted.

(First Embodiment)

Figure 4:
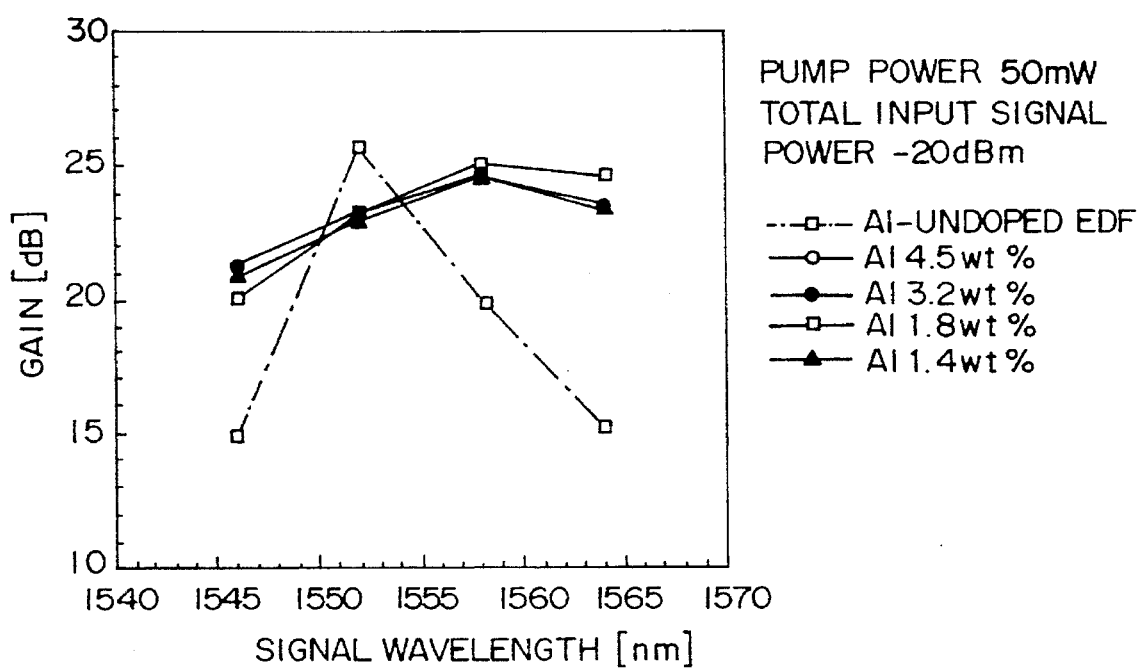
FIG. 4 is a graph showing wavelength dependency of gain of four-wavelength simultaneous amplification.

An optical fiber amplifier of the present embodiment belongs to the first type optical fiber amplifier of the present invention and it reduces the wavelength dependency of the gain in a predetermined wavelength range (1.5 μm band). Prior to the explanation of the present embodiment, a variation of a multi-wavelength amplification property of an Er-doped optical fiber (EDF) for multi-wavelength owing to a type of dopant, a doping concentration and a change of the length of the optical fiber will be described. FIG. 4 is a graph showing the wavelength dependency of the gain of four-wavelength simultaneous amplification for five kinds of EDFs with different Al concentrations. Here, the signal wavelengths are 1546, 1552, 1558 and 1564 nm and the total intensity of input signal lights is −14 dBm (−20 dBm/one wavelength). Total Er loss for each EDF is adjusted so as to be constant ($\alpha_{1.53}$ · L (length of optical fiber)=120 dB). It is seen from FIG. 4 that in the case of the Al-doped EDF, in regardless of a doping amount, a difference of gains due to a different wavelength is 3–4.5 dB. On the other hand, in the case of the Al-undoped EDF, a difference of gains due to a different wavelength is 11 dB.

Figure 5:
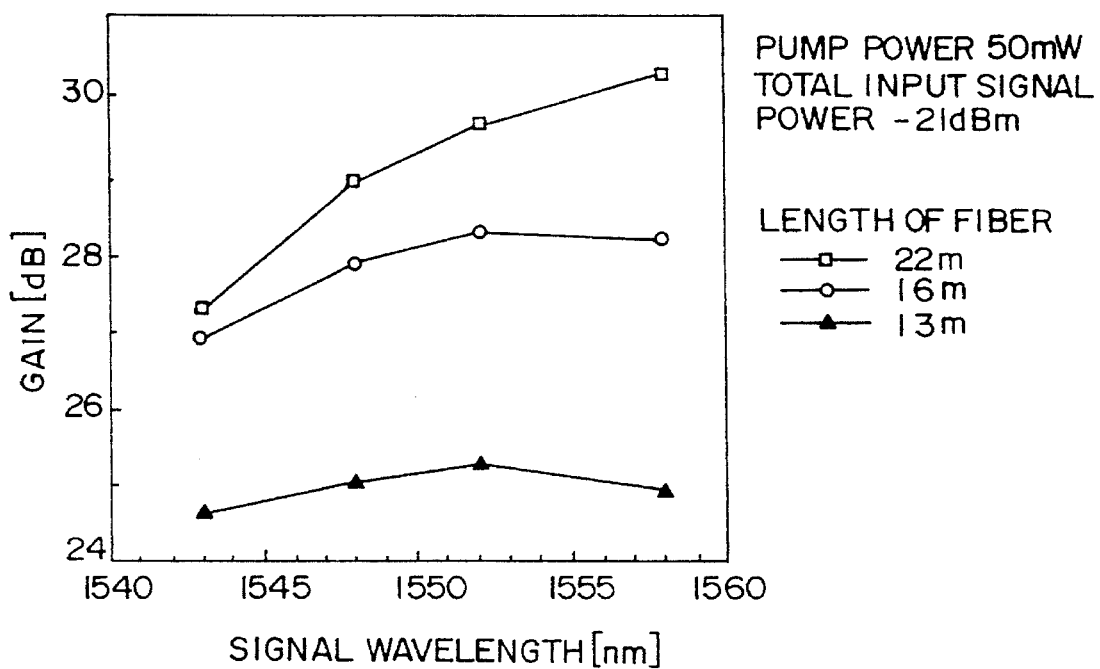
FIG. 5 is a graph showing wavelength dependency of gain in a case that the length of an EDF is varied.

FIG. 5 is a graph showing the wavelength dependency of the gain in the case that the length of an EDF having an Al concentration of 1.4 weight % is varied. Here, the signal wavelengths are 1543, 1548, 1552 and 1558 nm. The common specifications of these optical fibers are shown in Table 1.

TABLE 1

|  | Al-Doped EDF |
| --- | --- |
| Al Concentration (wt %) | 1.4 |
| P Concentration (wt %) | — |
| Er Absorption Loss (dB/M) | 5.2 (@1.53) |
| $\alpha_{1.2}$ (dB/km) | 9 |
| Cut-Off Wavelength (μm) | 1.3 |
| MFD @1.55 (μm) | 3.8 |

It is seen from FIG. 5 that as the optical fiber is shortened, the gain over different wavelengths becomes flat, and that as the optical fiber is lengthened, the wavelength dependency of the gain becomes large. It should be noted that if the optical fiber is shortened, the total output intensity is lowered.

Figure 6:
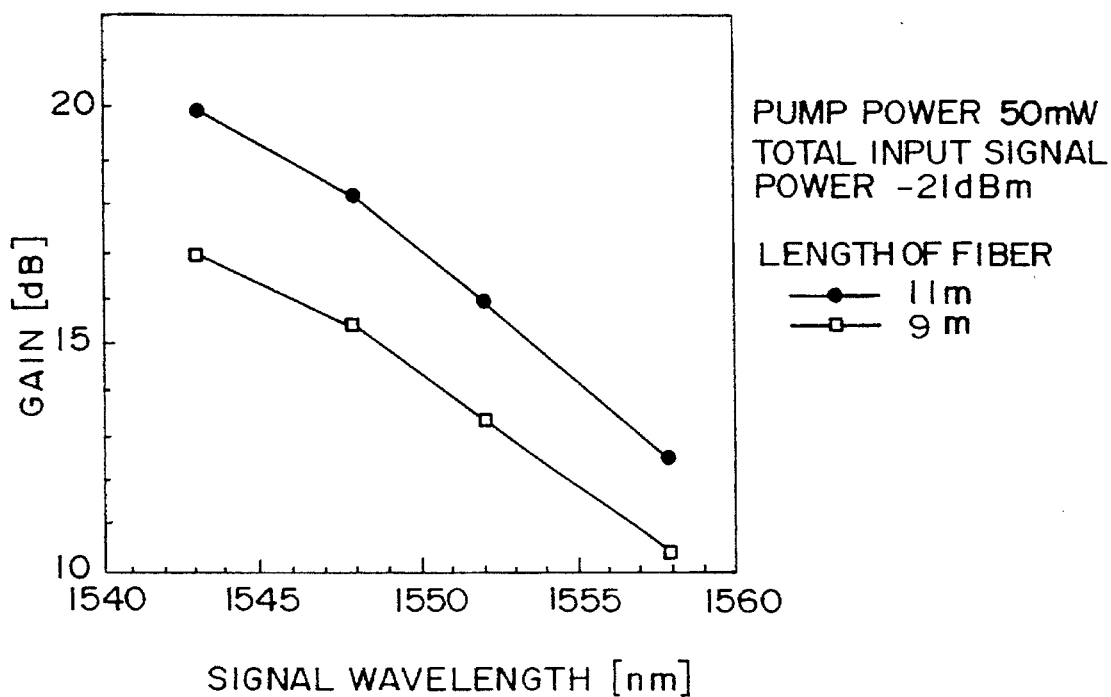
FIG. 6 is a graph showing wavelength dependency of gain in a case that the length of a P-Al-codoped EDF is changed.

FIG. 6 is a graph showing the wavelength dependency of the gain in the case that the length of a P-Al-codoped EDF having a P concentration of 5 weight % and an Al concentration of 1 weight % is changed. Here, the signal wavelengths are 1543, 1548, 1552 and 1558 nm. The common specification of these optical fibers is shown in Table 2.

TABLE 2

|  | P—Al-Doped EDF |
| --- | --- |
| Al Concentration (wt %) | 1 |
| P Concentration (wt %) | 5 |
| Er Absorption Loss (dB/m) | 3.1 (@1.54) |
| $\alpha_{1.2}$ (dB/km) | 9 |
| Cut-Off Wavelength (μm) | 1.2 |
| MFD @1.55 (μm) | 4.5 |

It is seen from the comparison of the wavelength dependency of the gain shown in FIG. 5 and FIG. 6 that there is a wavelength range where a tendency of the variation of the gain in accordance with increase of wavelength is opposite, depending on the length of the optical fiber.

The optical fiber amplifier of the present embodiment reduces the wavelength dependency in a predetermined wavelength range with a combination of optical fibers having plural kinds of compositions, utilizing the wavelength dependency of the gain owing to a type of dopant, a doping concentration and a change of the length of the optical fiber.

Figure 7:
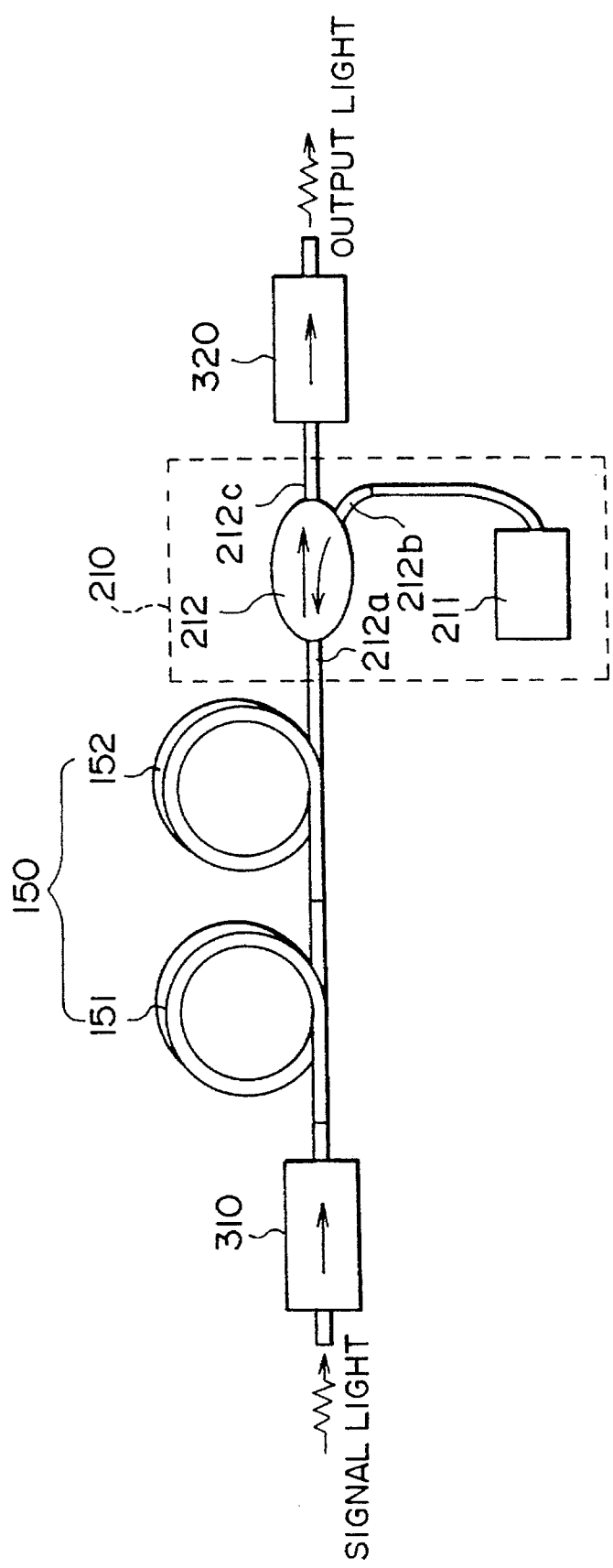
FIG. 7 is a view showing a configuration of an optical fiber amplifier of the first embodiment of the present invention.

FIG. 7 shows a configuration of an optical fiber amplifier of the present embodiment. As shown in FIG. 7, the optical fiber amplifier comprises (a) a composite optical fiber 150 in which a 16 m-optical fiber 151 with a composition shown in Table 1 having a core that Er is doped in a glass composition made of $SiO_2$, $GeO_2$ and $Al_2O_3$ is serially coupled by fusion with a 9 m-optical fiber 152 with a composition shown in Table 2 having a core that Er is doped in a glass composition made of $SiO_2$, $GeO_2$, $Al_2O_3$ and $P_2O_5$, (b) an excitation device 210 for supplying excitation light to the composite optical fiber 150, (c) an optical isolator 310 for receiving input signal light and transmitting only light propagating in a propagating direction of input signal light so that the transmitted light is incident on the composite optical fiber 150, and (d) an optical isolator 320 for transmitting only light propagating in a propagating direction of light, emerged from the composite optical fiber 150.

Figure 8:
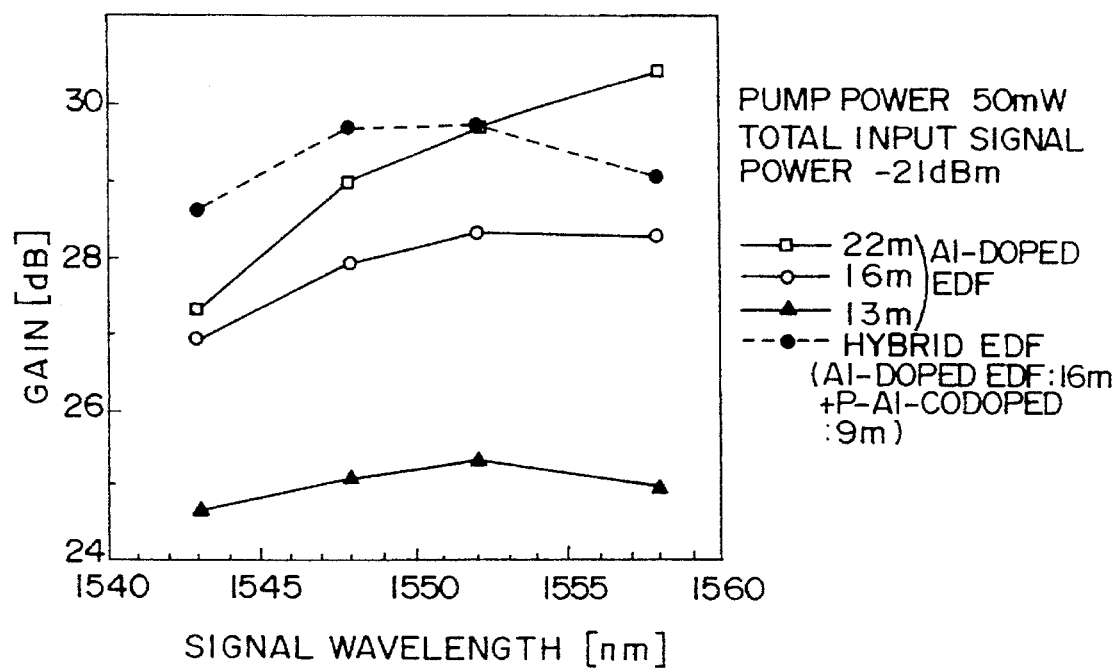
FIG. 8 is a graph showing the results of the measurement of wavelength dependency of gain of a composite optical fiber of the first embodiment of the present invention.

The results of the measurement of the wavelength dependency of the gain of the composite optical fiber 150 in which the optical fiber 151 is coupled with the optical fiber 152 by fusion are shown in FIG. 8. Note that the amplification property of the Al-doped optical fiber shown in FIG. 5 is also shown in FIG. 8 for comparison. It is seen from the graph of FIG. 8 that the wavelength dependency of the gain in a 1535–1565 nm-wavelength range of incident light is reduced as compared with the wavelength dependency of the gain of the optical fiber 151 or the optical fiber 152.

The excitation device 210 comprises (1) an excitation light source 211 for generating excitation light and (2) a directional coupler 212 for receiving amplified light emerging from the composite optical fiber 110 from a terminal 212 and emitting the light from a terminal 212c, and receiving the excitation light generated from the excitation light source 211 from the terminal 212b and emitting the excitation light from the terminal 212a to the composite optical fiber 150.

Note that to form a composite optical fiber which reduces the wavelength dependency of the gain with the above-described two kinds of the amplifying optical fibers, it is effective that a ratio of gain at a predetermined wavelength to a differential coefficient relative to a variation of a gain wavelength for the two kinds of the amplifying optical fibers is set to a value that a sign is opposite and that an absolute value is the same.

Figure 9:
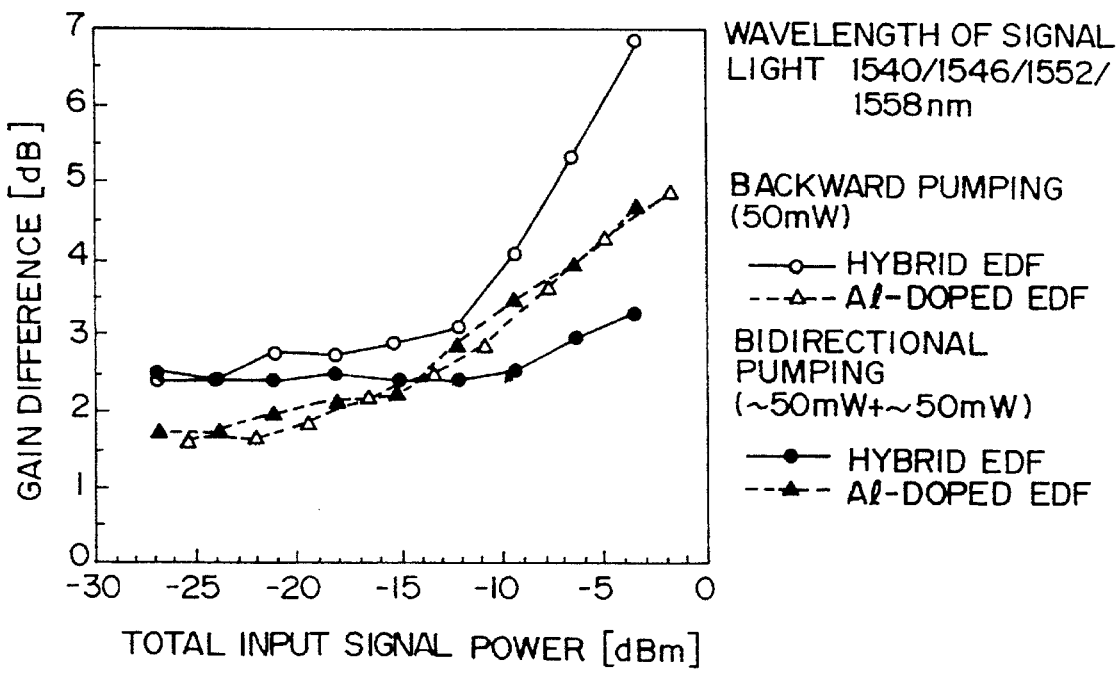
FIG. 9 is a graph showing a difference of amplification properties between backward pumping and bidirectional pumping of the first embodiment of the present invention.

In the present embodiment, the backward pumping is employed as a method for supplying excitation light but the forward pumping and the bidirectional pumping can be employed. FIG. 9 is a graph showing a difference of amplification properties between the backward pumping and the bidirectional pumping. It is seen from FIG. 9 that the wavelength dependency of the gain is reduced more with the bidirectional pumping as compared with the backward pumping in the case of the same intensity of input signal lights.

(Second Embodiment)

An optical fiber amplifier of the present embodiment belongs to the second type optical fiber amplifier of the present invention and it reduces the wavelength dependency of the gain in a predetermined wavelength range (1.5 μm band).

Figure 10:
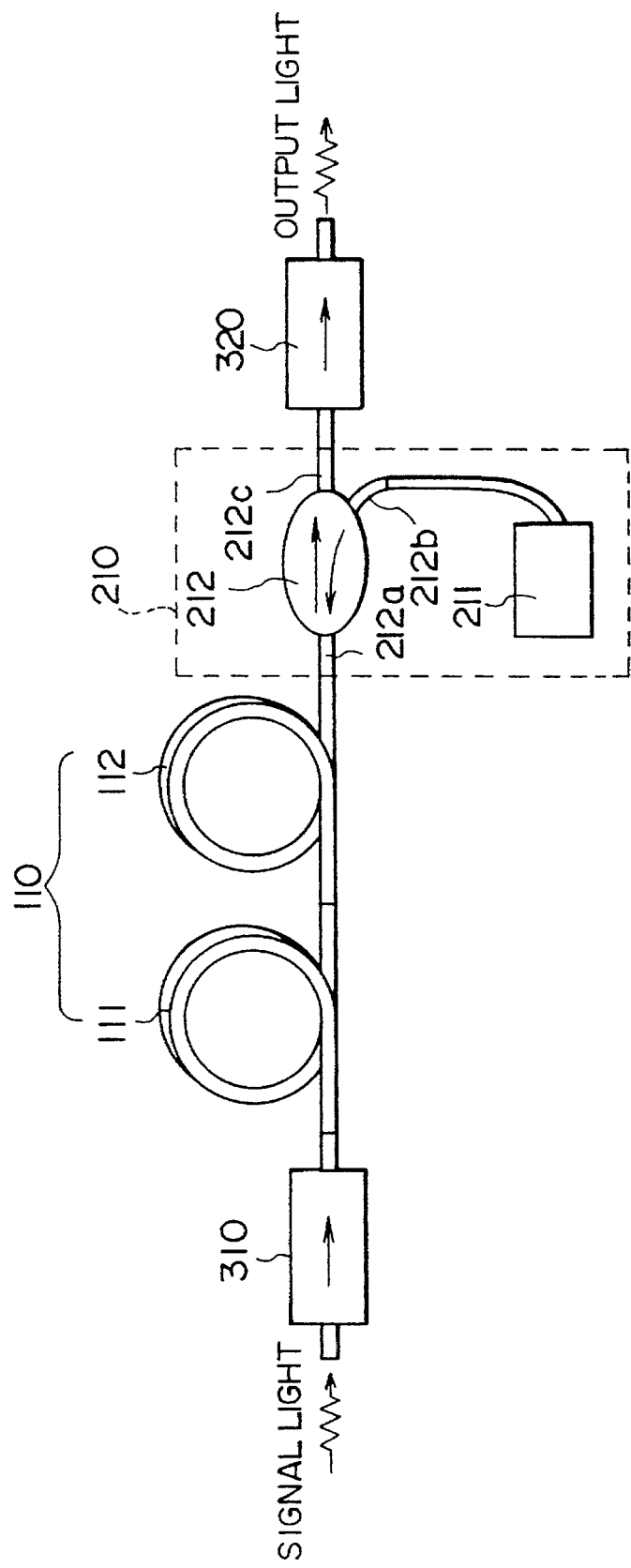
FIG. 10 is a view showing a configuration of an optical fiber amplifier of the second embodiment of the present invention.

FIG. 10 shows a configuration of an optical fiber amplifier of the present embodiment. As shown in FIG. 10, the optical fiber amplifier comprises (a) a composite optical fiber 110 in which an optical fiber 111 having a core that Er is doped in a glass composition made of $SiO_2$, $GeO_2$ and $Al_2O_3$ is coupled by fusion with an optical fiber 112 having a core that Er is doped in a glass composition made of $SiO_2$, $GeO_2$, $Al_2O_3$ and $P_2O_5$, (b) an excitation device 210 for supplying excitation light to the composite optical fiber 110, (c) an optical isolator 310 for receiving input signal light and transmitting only light propagating in a propagating direction of input signal light so that the transmitted light is incident on the composite optical fiber 110, and (d) an optical isolator 320 for transmitting only light propagating in a propagating direction of light, emerged from the composite optical fiber 110.

The optical fiber 111 has an Er concentration of 0.1 wt % and an Al concentration of 3.0 wt %, and a total Er loss in the optical fiber 111 is 35 dB. The optical fiber 112 has an Er concentration of 0.1 wt %, an Al concentration of 3.0 wt % and a P concentration of 3.9 % wt %, and a total Er loss in the optical fiber 112 is 5 dB. Here, the "total Er loss" is used to express the characteristic of the amplifying optical fiber, which totally shows the characteristic of the amplifying optical fiber against a gain difference owing to the glass composition of the core, the Er-doping concentration, and the length of the fiber. The "total Er loss" is a product (α. L: unit is dB) of "loss per unit length (α: unit is dB/m) at a certain wavelength due to presence of Er" and "fiber length (L: unit is m)". Note that the amplifying optical fibers which have the same total Er loss can be considered to have the same amplification ability.

Figure 11:
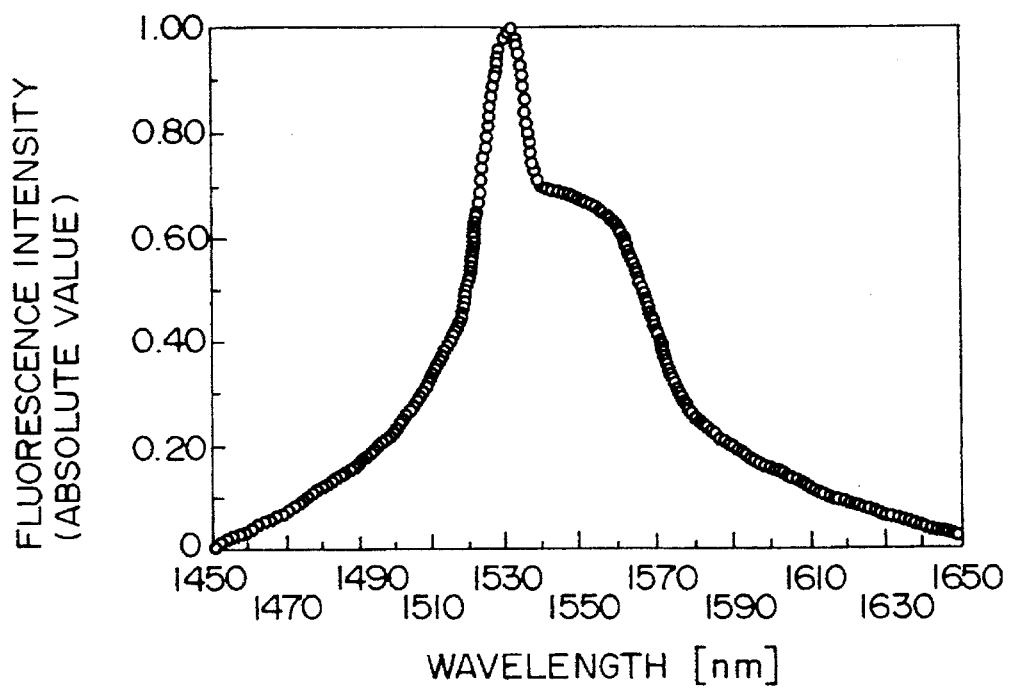
FIG. 11 and FIG. 12 are graphs showing characteristics of an amplifying optical fiber of the second embodiment.
Figure 12:
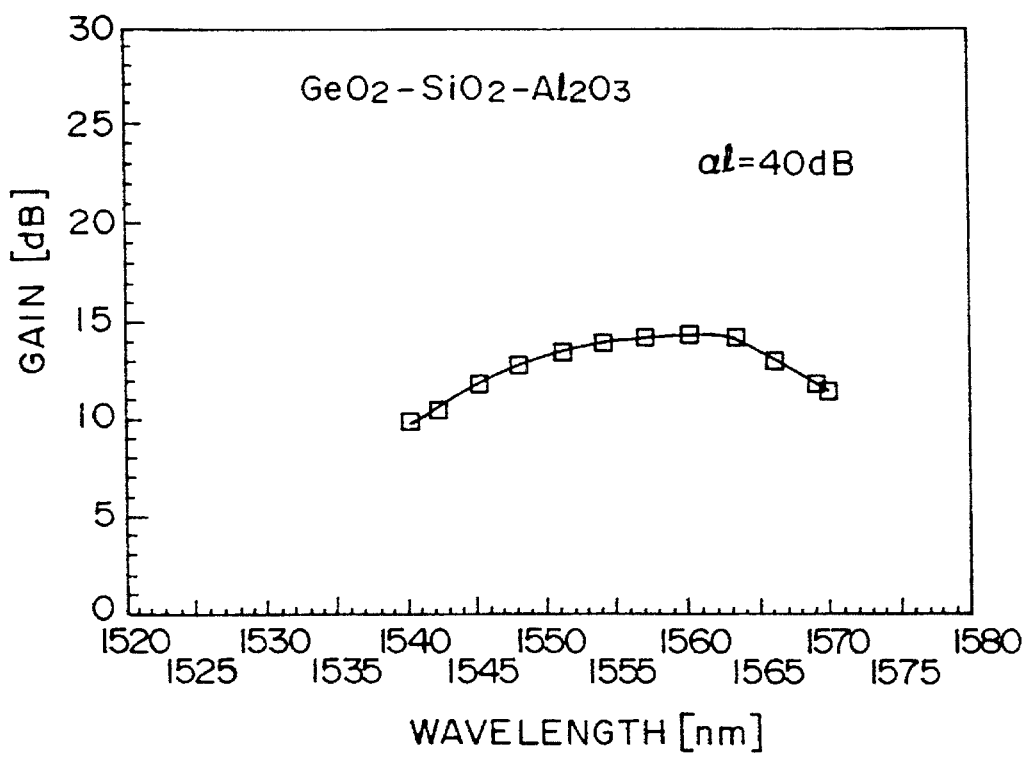
Figure 13:
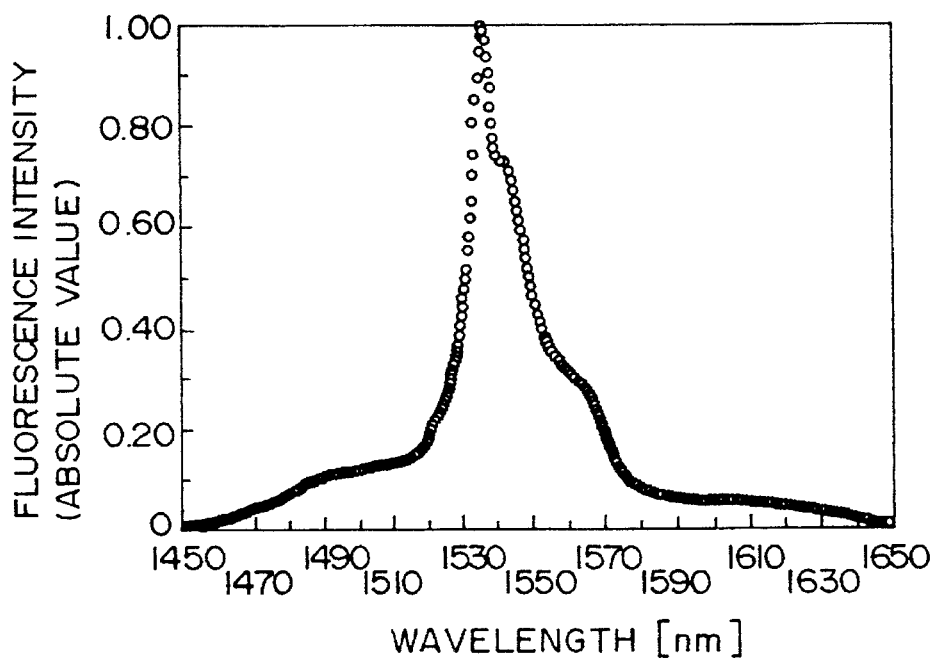
FIG. 13 and FIG. 14 are graphs showing characteristics of an amplifying optical fiber of the second embodiment.
Figure 14:
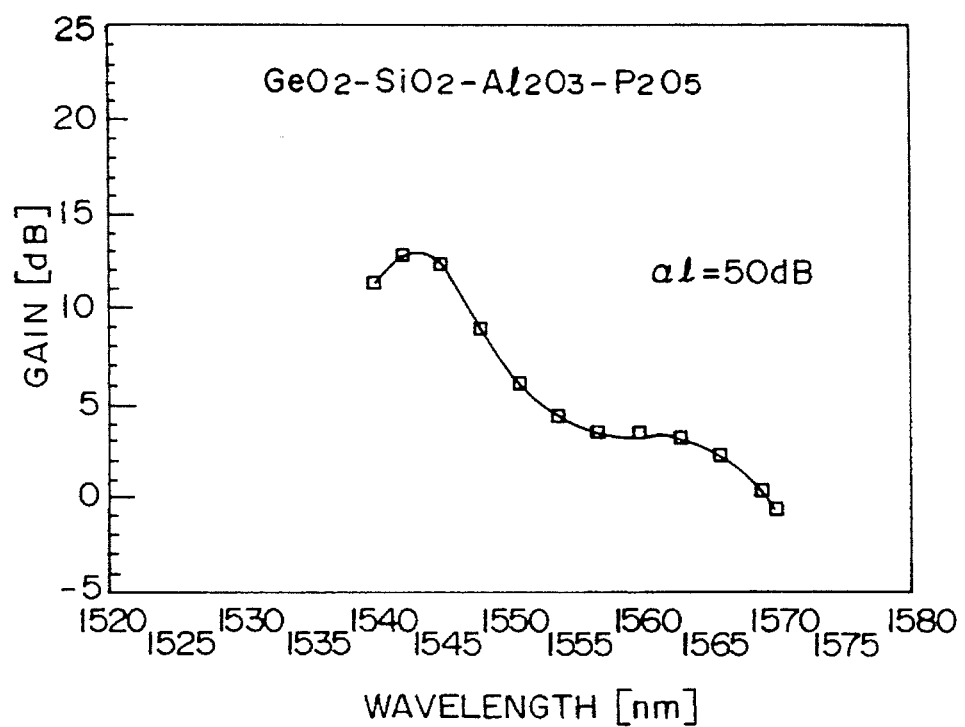

FIG. 11 and FIG. 12 are graphs showing a characteristic of the optical fiber 111. FIG. 11 shows the wavelength dependency of an intensity of fluorescence (spontaneous emission from the excited Er) generated when only excitation light is incident without signal light incidence. FIG. 12 shows the wavelength dependency of the gain of an amplifying optical fiber having the same composition as the optical fiber 112 and the 40 dB total Er loss at a 1.55 pm wavelength, with the sufficiently excited Er (induced emission from the excited Er). Since the tendency of the wavelength dependency (wavelength at which a maximum gain is observed) is not varied with a difference of total Er losses, the optical fiber 111 also shows the same tendency of the wavelength dependency. Note that a method disclosed in the aforementioned "S. L. Hansen et al., IEEE Photon. Technol. Lett. Vol. 4, No. 4, 1993, pp409–411" is used for the measurement of the gain except that the backward pumping is employed. FIG. 13 shows the wavelength dependency of the intensity of fluorescence (spontaneous emission from the excited Er) generated when only excitation light is incident without signal light incidence. FIG. 14 shows the wavelength dependency of the gain of an amplifying optical fiber having the same composition as the optical fiber 112 and the 50 dB total Er loss, with sufficiently excited Er (induced emission from the excited Er). Note that for the measurement of the gain, the same method as in FIG. 12 is used.

Figure 15:
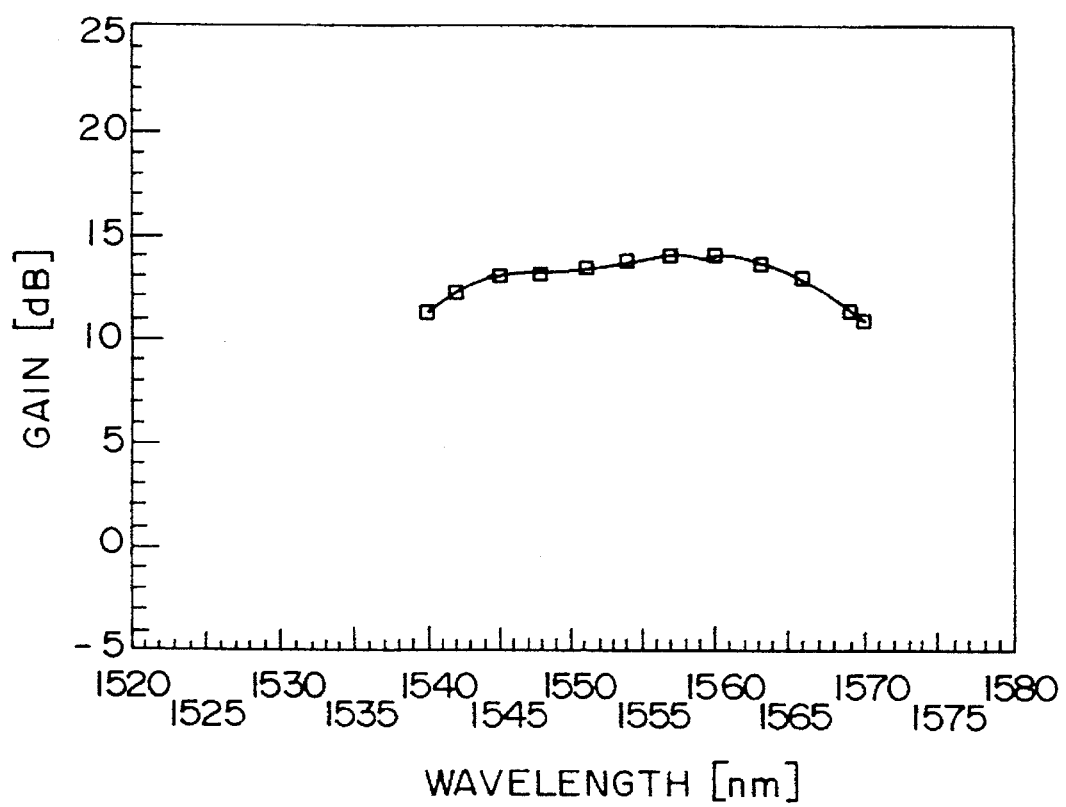
FIG. 15 is a graph showing characteristics of a composite optical fiber of the second embodiment.

The results of the measurement of the wavelength dependency of the gain of the composite optical fiber 110 in which the optical fiber 111 and the optical fiber 112 having the characteristics of FIGS. 11–14 are coupled by fusion are shown in FIG. 15. Note that for the measurement of the gain, the same method as in FIG. 12 is used. As the graph of FIG. 15 is compared with the graph of FIG. 12 and the graph of FIG. 14, the wavelength dependency of the gain in the 1540–1570 nm wavelength range of the input light is reduced more than the wavelength dependency of the gain of the optical fiber 111 or the optical fiber 112.

Further, the excitation device 210 comprises (1) an excitation light source 211 for generating excitation light and (2) a directional coupler 212 for receiving amplified light emerging from the composite optical fiber 110 from a terminal 212a and emitting the light from a terminal 212c, and receiving the excitation light generated by the excitation light source 211 from the terminal 212b and emitting the excitation light from the terminal 212a to the composite optical fiber 110.

In this optical fiber amplifier, Er in the composite optical fiber 110 is excited with excitation light supplied from the excitation device 210, and both the optical fiber 111 and the optical fiber 112 are set in a ready state for amplifying input signal light. With this state, when signal light (1.5 μm band) is incident on the composite optical fiber 110 through the optical isolator 310, first the signal light is amplified so as to have the wavelength dependency shown in FIG. 12 by induced emission from the excited Er in the optical fiber 111. At the same time as the amplification of the signal light, light with the wavelength dependency shown in FIG. 11 is generated due to spontaneous emission and the generated light together with the induced emission light is incident on the optical fiber 112. The light incident on the optical fiber 112 is amplified so as to have the wavelength dependency shown in FIG. 14 by the induced emission from the excited Er in the optical fiber 112. At the same time as the amplification of the light, light with the wavelength dependency shown in FIG. 13 is generated due to spontaneous emission and the generated light together with the induced emission light emerges from the composite optical fiber 110. Light emerged from the composite optical fiber 110 is amplified so as to have the wavelength dependency shown in FIG. 15 while propagating successively through the directional coupler 212 and the optical isolator 320, and then becomes output light of the optical fiber amplifier.

In the present embodiment, the two optical fibers, the optical fiber 111 and the optical fiber 112 form the composite optical fiber 110 but an optical fiber having the same composition as the optical fiber 111, a shorter length than the optical fiber 111, and a $n_1$ total Er loss is serially coupled with an optical fiber having the same composition as the optical fiber 112, a shorter length than the optical fiber 112, and an $n_2$ ($=n_1/7$) total Er loss to form a pair of the fibers, and a plurality of the pairs of the fibers can be coupled in series so that the total Er loss is 40 dB as the composite optical fiber. In this composite optical fiber, the difference of excitation light intensities between each of the adjacent optical fibers is small as compared with the present embodiment, so that a task of considering a relative difference of gain characteristics and a variation of the intensity of excitation light due to fiber compositions can be reduced. In other words, a composite optical fiber which has characteristics which are simply expected from the relative relations of the characteristics of the single optical fiber can be formed.

Note that to form a composite optical fiber which reduces the wavelength dependency of the gain with the above-described two kinds of the amplifying optical fibers, it is effective that a ratio of gain at a predetermined wavelength to a differential coefficient relative to a variation of a gain wavelength for the two kinds of the amplifying optical fibers is set to a value that a sign is opposite and that an absolute value is the same.

In the present embodiment, the backward pumping is employed as a method for supplying excitation light but the forward pumping and the bidirectional pumping can be employed, by which the wavelength dependency of the composite optical fiber 110 can also be set different from the wavelength dependency of the optical fiber 111 or the optical fiber 112.

(Third Embodiment)

Figure 16:
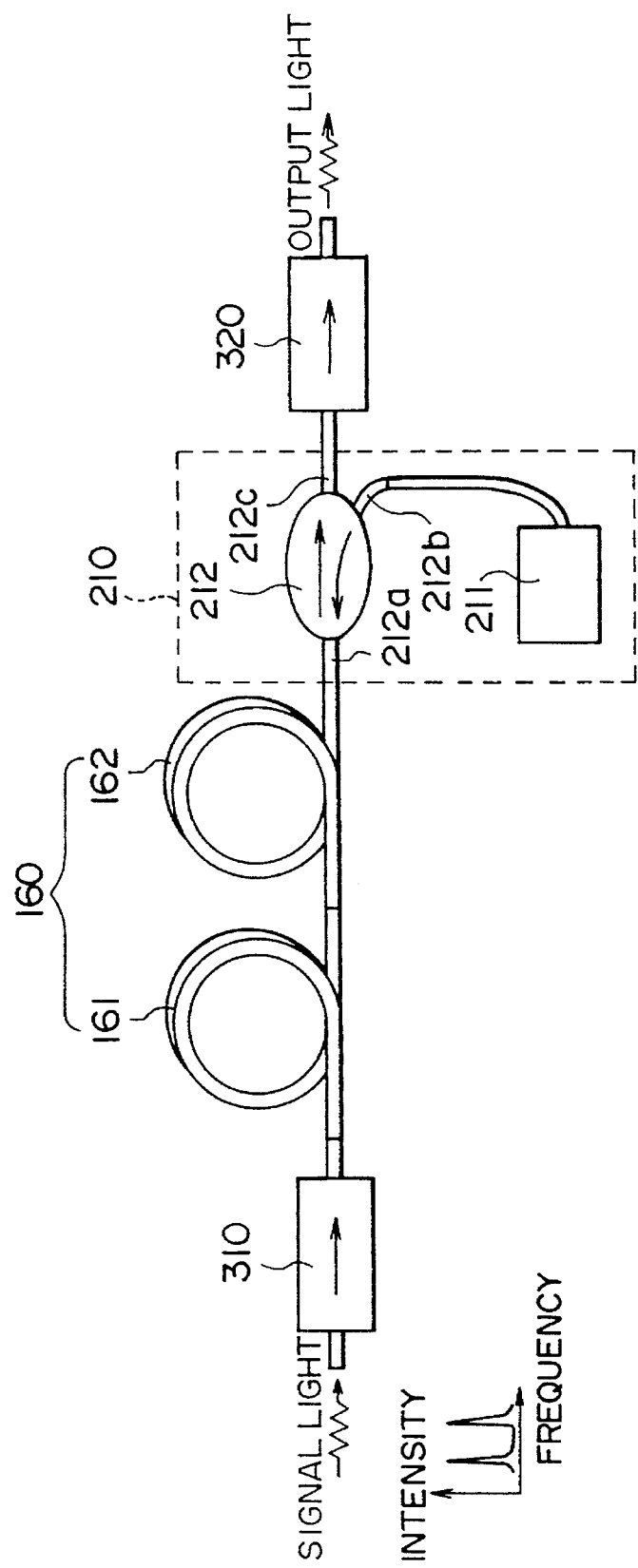
FIG. 16 is a view showing a configuration of an optical fiber amplifier of the third embodiment of the present invention.

FIG. 16 shows a configuration of an optical fiber amplifier of the present embodiment. This amplifier amplifies light which including two or more waves. As shown in FIG. 16, the optical fiber amplifier comprises (a) a composite optical fiber 160 in which a 16 m-optical fiber 161 having a core that Er is doped in a glass composition made of $SiO_2$, $GeO_2$ and $Al_2O_3$ is coupled by fusion with a 9m-optical fiber 162 having a core that Er is doped in a glass composition made of $SiO_2$, $GeO_2$, $Al_2O_3$ and $P_2O_5$, (b) an excitation device 210 for supplying excitation light to the composite optical fiber 160, (c) an optical isolator 310 for receiving input signal light and transmitting only light propagating in a propagating direction of input signal light so that the transmitted light is incident on the composite optical fiber 160, and (d) an optical isolator 320 for transmitting only light propagating in a propagating direction of light, emerged from the composite optical fiber 160.

The composition of the optical fiber 161 is the one shown in Table 3, and the composition of the optical fiber 162 is the one shown in Table 4.

TABLE 3

|  | Al-Doped EDF |
| --- | --- |
| Al Concentration (wt %) | 1.4 |
| P Concentration (wt %) | — |
| Er Absorption Loss (dB/m) | 5.2 (@1.53) |
| $\alpha_{1.2}$ (dB/km) | 9 |
| Cut-Off Wavelength (μm) | 1.3 |
| MFD @1.55 (μm) | 3.8 |
| Total Er Absorption Loss (dB) | 15 |

TABLE 4

|  | P—Al-Doped EDF |
| --- | --- |
| Al Concentration (wt %) | 1 |
| P Concentration (wt %) | 5 |
| Er Absorption Loss (dB/m) | 3.1 (@1.54) |
| $\alpha_{1.2}$ (dB/km) | 9 |
| Cut-Off Wavelength (μm) | 1.2 |
| MFD @1.55 (μm) | 4.5 |
| Total Er Absorption Loss (dB) | 30 |

Figure 17:
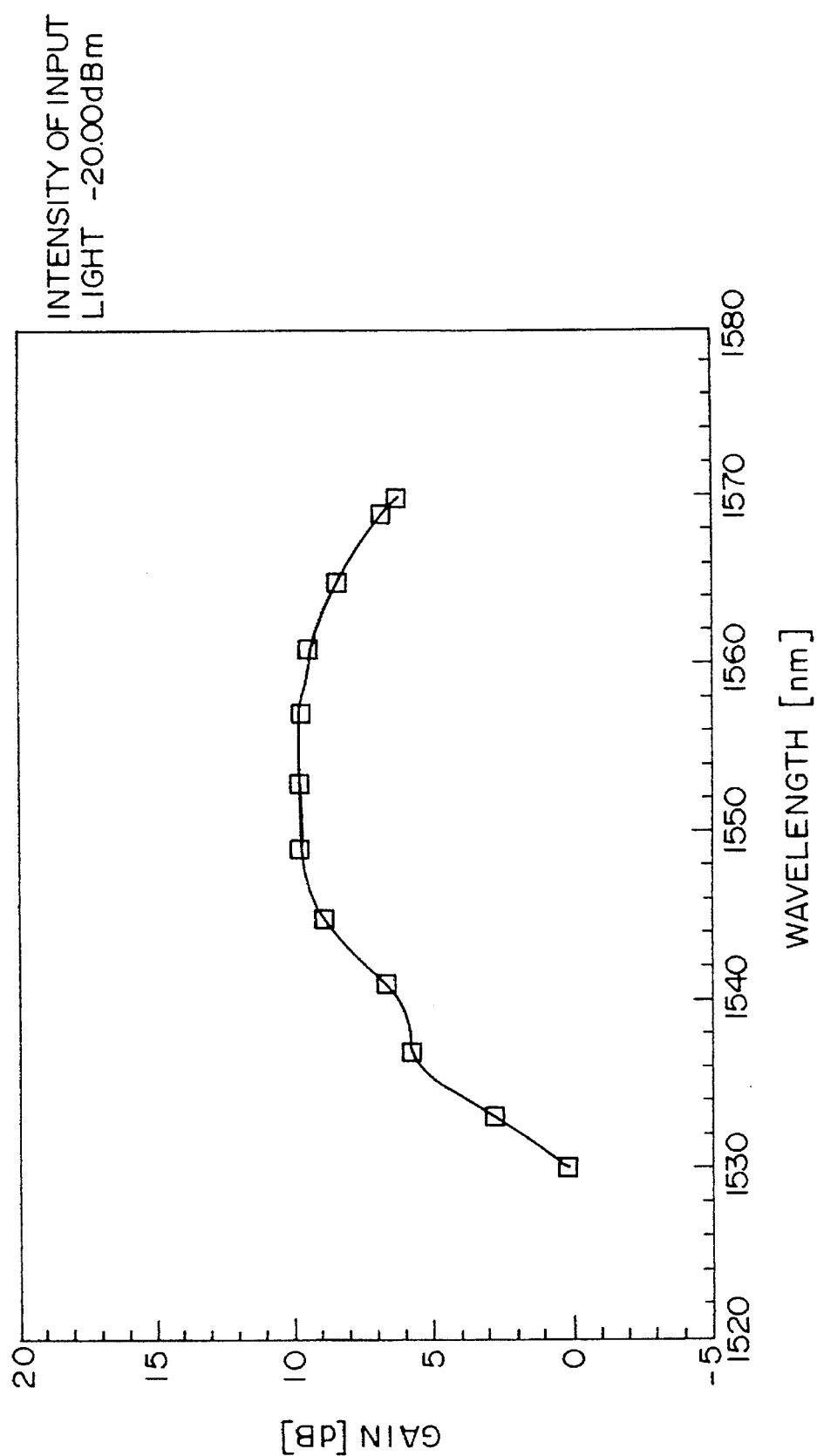
FIG. 17 is a graph showing the results of the measurement of wavelength dependency of gain of a composite optical fiber of the third embodiment of the present invention.

The results of the measurement of the wavelength dependency of the gain of the composite optical fiber 160 in which the optical fiber 161 and the optical fiber 162 are coupled by fusion are shown in FIG. 17. It is seen from the graph of FIG. 17 that the wavelength dependency of the gain in the 1535–1565 nm-wavelength range of input light is reduced as compared with the wavelength dependency of the gain of the optical fiber 161 or the optical fiber 162.

The excitation device 210 comprises (1) an excitation light source 211 for generating excitation light and (2) a directional coupler 212 for receiving amplified light emerging from the composite optical fiber 110 from a terminal 212a and emitting the light from a terminal 212c, and receiving the excitation light generated from the excitation light source 211 from the terminal 212b and emitting the excitation light from the terminal 212a to the composite optical fiber 160.

Note that to form a composite optical fiber which reduces the wavelength dependency of the gain with the above-described two kinds of the amplifying optical fibers, it is effective that a ratio of gain at a predetermined wavelength to a differential coefficient relative to a variation of a gain wavelength for the two kinds of the amplifying optical fibers is set to a value that a sign is opposite and that an absolute value is the same.

Note that the measurement system is the same as in the embodiment 2, and that the input signal light power for LI=+1.4 dBm/one wavelength, the signal light wavelengths for LI=1552 and 1558 nm, the excitation light power=70 mW.

(Fourth Embodiment)

An optical fiber amplifier of the present embodiment belongs to the fourth type of the present invention, and it controls a gain peak wavelength at which the gain is the largest in a predetermined wavelength range (1.5 μm band). Note that the optical fiber amplifier of the present embodiment has the same configuration as in the first embodiment except a composite optical fiber 120.

Figure 18:
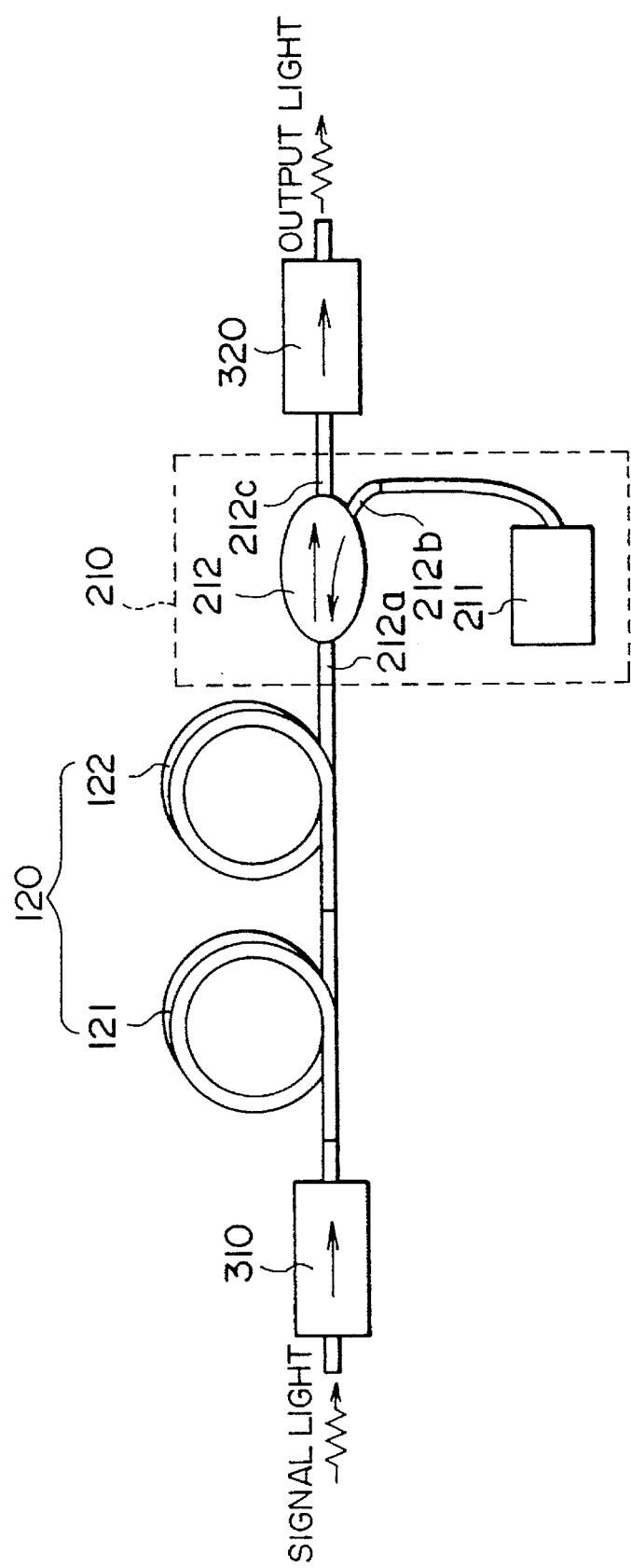
FIG. 18 is a view showing a configuration of an optical fiber amplifier of the fourth embodiment of the present invention.

FIG. 18 shows a configuration of an optical fiber amplifier of the present invention. As shown in FIG. 18, the optical fiber amplifier comprises (a) a composite optical fiber 120 in which an optical fiber 121 having a core that Er is doped in a glass composition made of $SiO_2$ and $GeO_2$ is coupled by fusion with an optical fiber 122 having a core that Er is doped in a glass composition made of $SiO_2$, $GeO_2$ and $Al_2O_3$, (b) an excitation device 210 for supplying excitation light to the composite optical fiber 120, (c) an optical isolator 310 for receiving input signal light and transmitting only light propagating in a propagating direction of input signal light so that the transmitted light is incident on the composite optical fiber 120, and (d) an optical isolator 320 for transmitting only light propagating in a propagating direction of light, emerged from the composite optical fiber 120.

The optical fiber 121 has an Er concentration of 0.04 wt % and a total Er loss in the optical fiber 121 is 20 dB. The optical fiber 122 has the same composition as in the first embodiment, and the total Er loss in the optical fiber 122 is 20 dB.

Figure 19:
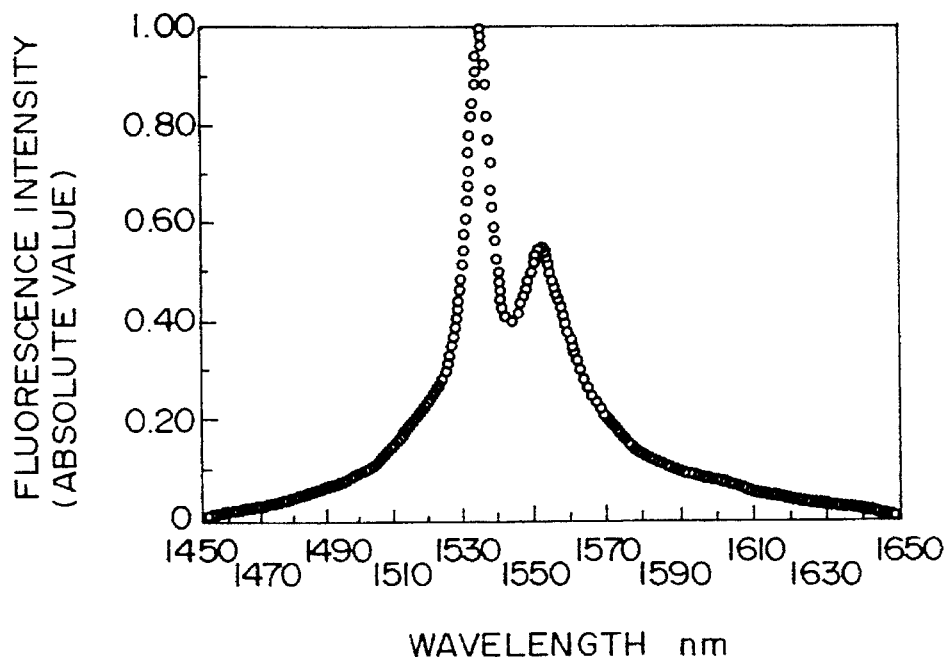
FIG. 19 and FIG. 20 are graphs showing characteristics of an amplifying optical fiber of the fourth embodiment.
Figure 20:
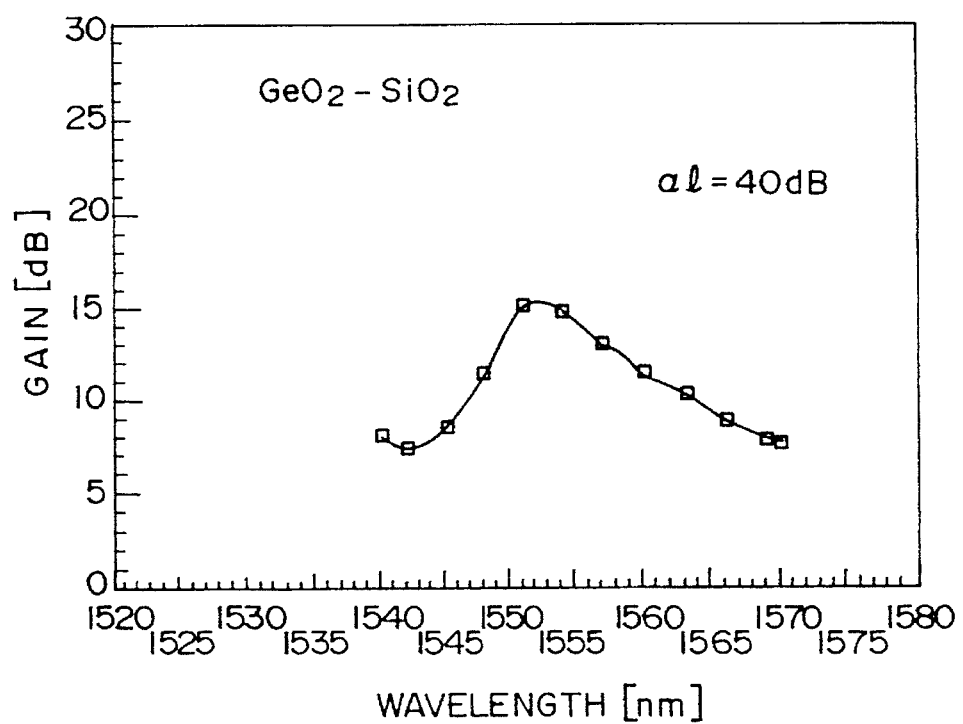

FIG. 19 and FIG. 20 are graphs showing a characteristic of the optical fiber 121. FIG. 19 shows the wavelength dependency of an intensity of fluorescence (spontaneous emission from the excited Er) generated when only excitation light is incident without signal light incidence. FIG. 20 shows the wavelength dependency of the gain of an amplifying optical fiber having the same composition as the optical fiber 121 and the 40 dB total Er loss at a 1.55 μm wavelength with the sufficiently excited Er (induced emission from the excited Er). Since the tendency of the wavelength dependency (e.g., a wavelength at which a maximum gain is observed) is not varied with a difference of total Er losses, the optical fiber 121 also shows the same tendency of the wavelength dependency. Note that the same method as in FIG. 12 is used for the measurement of the gain. The characteristics of the optical fiber 122 is the one shown in FIG. 13 and FIG. 14.

Figure 21:
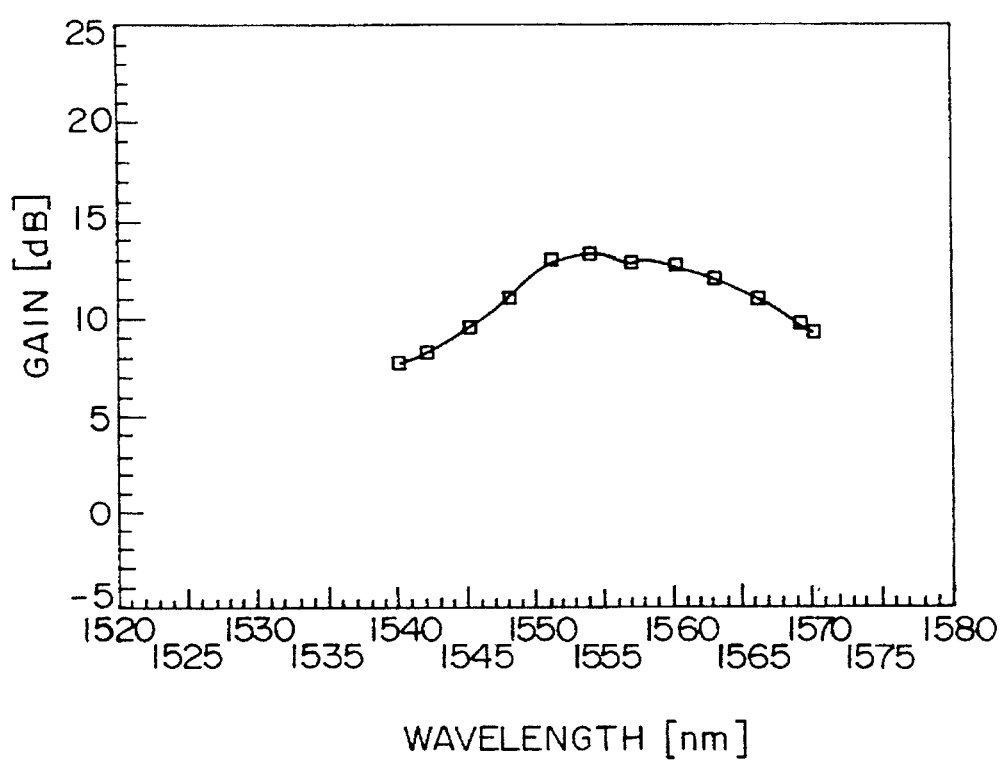
FIG. 21 is a graph showing characteristics of a composite optical fiber of the fourth embodiment.

The results of the measurement of the wavelength dependency of the gain of the composite optical fiber 120, in which the optical fiber 121 and the optical fiber 122 having the characteristics shown in FIGS. 19 and 20, and FIGS. 13 and 14, respectively are coupled, is shown in FIG. 21. Note that the same method as in FIG. 12 is used for the measurement of the gain. As the graph of FIG. 21 is compared with the graph of FIG. 20 and the graph of the FIG. 12, it is seen that the wavelength at which the maximum gain appears in the 1530–1570 nm-wavelength range of input light is different from the case of the optical fiber 121 or the optical fiber 122.

In this optical fiber amplifier, Er in the composite optical fiber 120 is excited with excitation light supplied from the excitation device 210, and both the optical fiber 121 and the optical fiber 122 are set in a ready state for amplifying input signal light. with this state, when signal light (1.5 μm band) is incident on the composite optical fiber 120 through the optical isolator 310, first the signal light is amplified so as to have the wavelength dependency shown in FIG. 20 by induced emission from the excited Er in the optical fiber 121. At the same time as the amplification of the signal light, light with the wavelength dependency shown in FIG. 19 is generated due to spontaneous emission and the generated light together with the induced emission light is incident on the optical fiber 122. The light incident on the optical fiber 122 is amplified so as to have the wavelength dependency shown in FIG. 12 by the induced emission from the excited Er in the optical fiber 122. At the same time as the amplification of the light, light with the wavelength dependency shown in FIG. 11 is generated due to spontaneous emission and the generated light together with the induced emission light emerges from the composite optical fiber 120. Light emerged from the composite optical fiber 120 is amplified so as to have the wavelength dependency shown in FIG. 21 while propagating successively through the directional coupler 212 and the optical isolator 320, and then becomes output light of the optical fiber amplifier.

In the present embodiment, the backward pumping is employed as a method for supplying excitation light but the forward pumping and the bidirectional pumping can be employed, by which the wavelength dependency of the composite optical fiber 120 can also be set different from the wavelength dependency of the optical fiber 121 or the optical fiber 122.

It should be noted that the ratio of total Er losses, and the composition of the amplifying optical fiber are not limited to the above-described first embodiment or the second embodiment, and also the amplifying optical fibers constituting the composite optical fiber are not limited to the two kinds. As the ratio of the total Er losses, the composition of the amplifying optical fiber, or the number of kinds of the amplifying optical fibers is controlled, the optical fiber amplifiers with the various wavelength dependency of the gain can be achieved.

(Fifth Embodiment)

The present embodiment belongs to the optical amplifier repeater, and comprises the fourth type optical fiber amplifier of the present invention.

Figure 22:
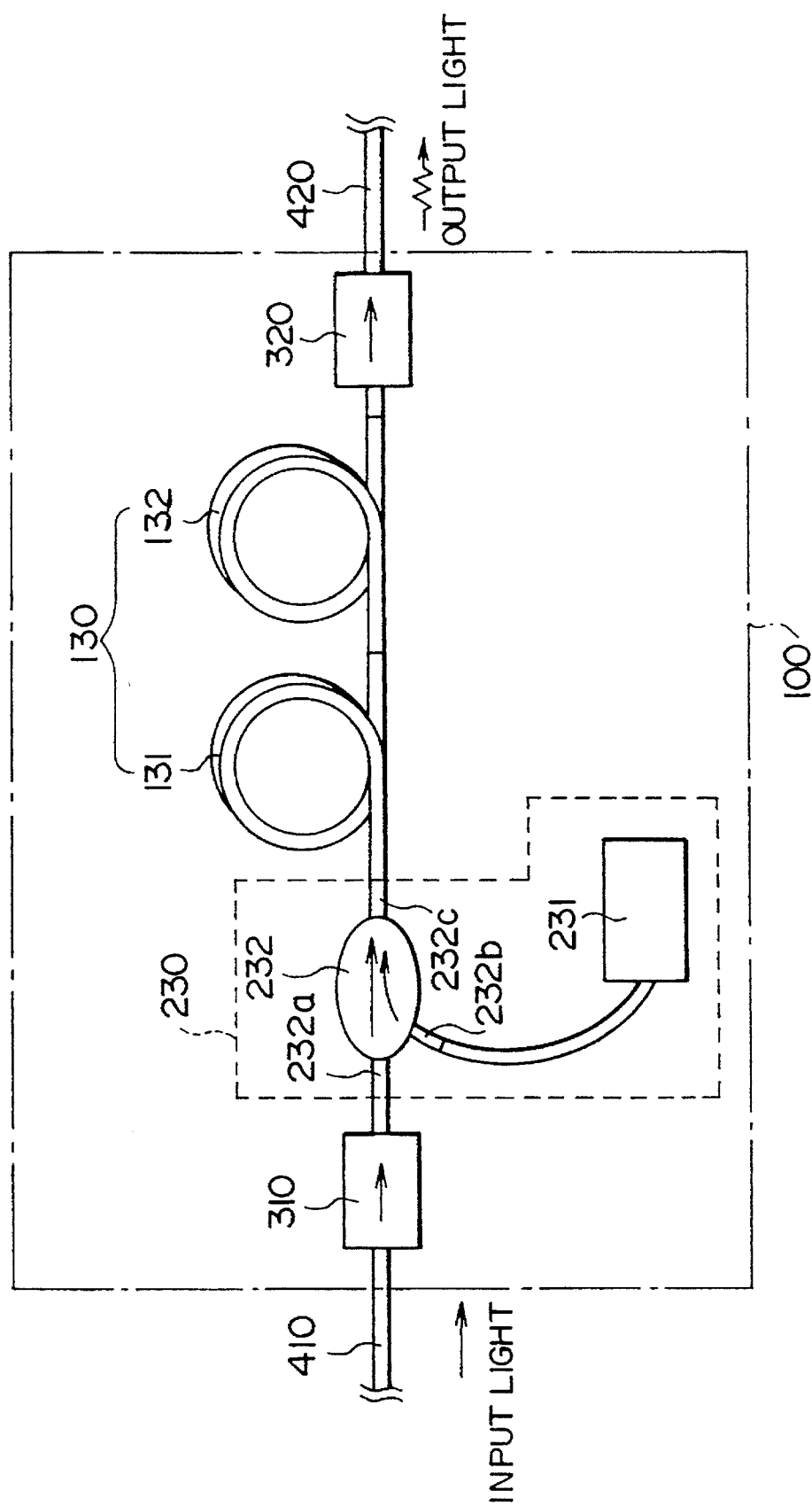
FIG. 22 is a view showing a configuration of an optical amplifier repeater of the fifth embodiment of the present invention.

FIG. 22 shows a configuration of an optical fiber amplifier of the present invention. As shown in FIG. 22, the optical amplifier repeater comprises an optical fiber amplifier 100, receives signal light through a transmitting optical fiber 410, amplified the signal light, and emits the amplified signal light to a transmitting optical fiber 420. The optical fiber amplifier 100 comprises (a) a composite optical fiber 130 in which an optical fiber 131 having a core that Er is doped in a first glass made of $SiO_2$, $GeO_2$ and $Al_2O_3$ is coupled by fusion with an optical fiber 132 having a core that Er is doped in a second glass made of $SiO_2$, $GeO_2$ and $Al_2O_3$, (b) an excitation device 230 for supplying excitation light to the composite optical fiber 130, (c) an optical isolator 310 for receiving input signal light and transmitting only light propagating in a propagating direction of input signal light so that the transmitted light is incident on the composite optical fiber 130, and (d) an optical isolator 320 for transmitting only light propagating in a propagating direction of light, emerged from the composite optical fiber 130.

The optical fiber 131 has an Er concentration of 0.1 wt % and an Al concentration of 0.2 wt %, and a total Er loss in the optical fiber 131 is 40 dB. The optical fiber 132 has an Er concentration of 0.1 wt % and an Al concentration of 1.0 wt %, and a total Er loss in the optical fiber 132 is 40 dB.

Further, the excitation device 230 comprises (1) an excitation light source 231 for generating excitation light and (2) a directional coupler 232 for receiving signal light emitted from the optical isolator 310 from a terminal 232a and emitting the light to the composite optical fiber 310 from a terminal 232c, and receiving the excitation light generated by the excitation light source 231 from the terminal 232b and emitting the excitation light from the terminal 232c to the composite optical fiber 130.

Figure 23:
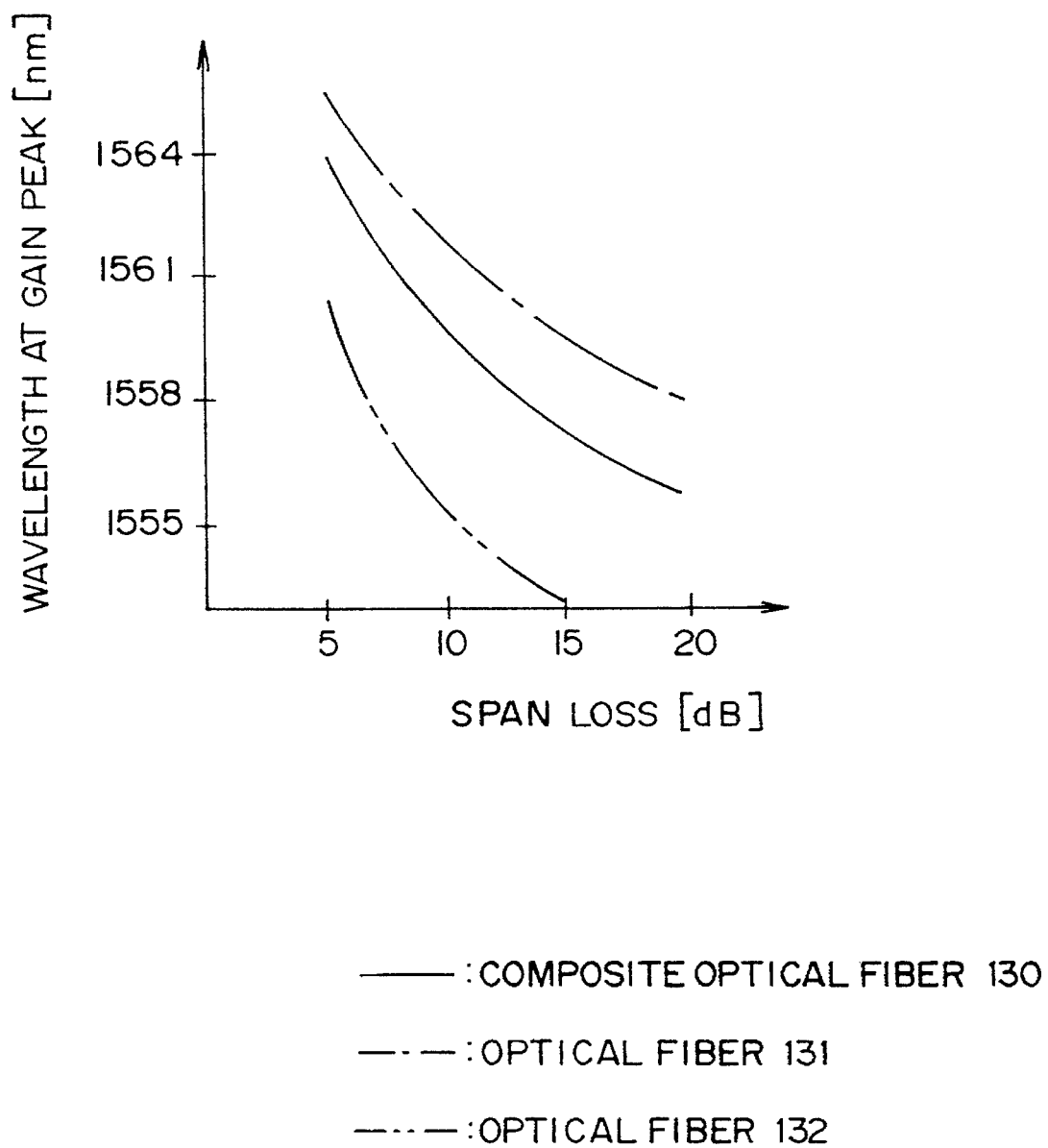
FIG. 23 is a graph showing characteristics of an optical amplifier repeater of the fifth embodiment.

FIG. 23 is a graph showing a characteristic of a span loss in the case that the optical amplifier repeater of the present embodiment is used in the multistage relay transmission line. When a plurality of the compositions in which the optical amplifier repeater is placed in the latter stage of the communication line with a certain span loss are connected in series, the span loss and the relay amplification are sufficiently stable in the latter, and FIG. 23 shows a relation between the span loss and the wavelength at the gain peak with this stable condition. Note that a characteristic of an optical fiber of which the total Er loss is 80 dB at a 1.53 μm wavelength and which has the same composition as the optical fiber 131, and a characteristic of an optical fiber of which the total Er loss is 80 dB and which has the same composition as the optical fiber 132 are also shown in FIG. 23 for comparison. It is seen from the comparison in the graph of FIG. 23 that the dependency of the wavelength at the gain peak of the composite optical fiber 130 owing to the span loss is a variation of the dependency of the wavelength at the gain peak of the single optical fiber owing to the span loss.

In this optical fiber amplifier, Er in the composite optical fiber 130 is excited with excitation light supplied from the excitation device 230, and both the optical fiber 131 and the optical fiber 132 are set in a ready state for amplifying input signal light. with this state, when signal light (1.5 μm band) is incident on the composite optical fiber 130 through the optical isolator 310 and the directional coupler 232, first the signal light is amplified by induced emission from the excited Er in the optical fiber 131. At the same time as the amplification of the signal light, light is generated due to spontaneous emission and the generated light together with the induced emission light is incident on the optical fiber 132. The light incident on the optical fiber 132 is amplified by the induced emission from the excited Er in the optical fiber 132. At the same time as the amplification of the light, light is generated due to spontaneous emission and the generated light together with the induced emission light emerges from the composite optical fiber 130. Light emerged from the composite optical fiber 130 is amplified through the optical isolator 320 so as to have the amplification property that the wavelength at the gain peak is determined in accordance with the dependence on the span loss as shown in FIG. 23, and then becomes output light of the optical amplifier repeater.

In the present embodiment, the forward pumping is employed as a method for supplying excitation light but the backward pumping and the bidirectional pumping can be employed, by which the wavelength dependency of the composite optical fiber 130 can also be set different from the wavelength dependency of the optical fiber 131 or the optical fiber 132.

In the above first through fifth embodiments components of the cores are made of $SiO_2$ and $GeO_2$ but if they are made of $SiO_2$, the same effects will be obtained.

(Sixth Embodiment)

The present embodiment belongs to the optical amplifier repeater as similar to the fifth embodiment, and comprises the second type optical fiber amplifier of the present invention.

Figure 24:
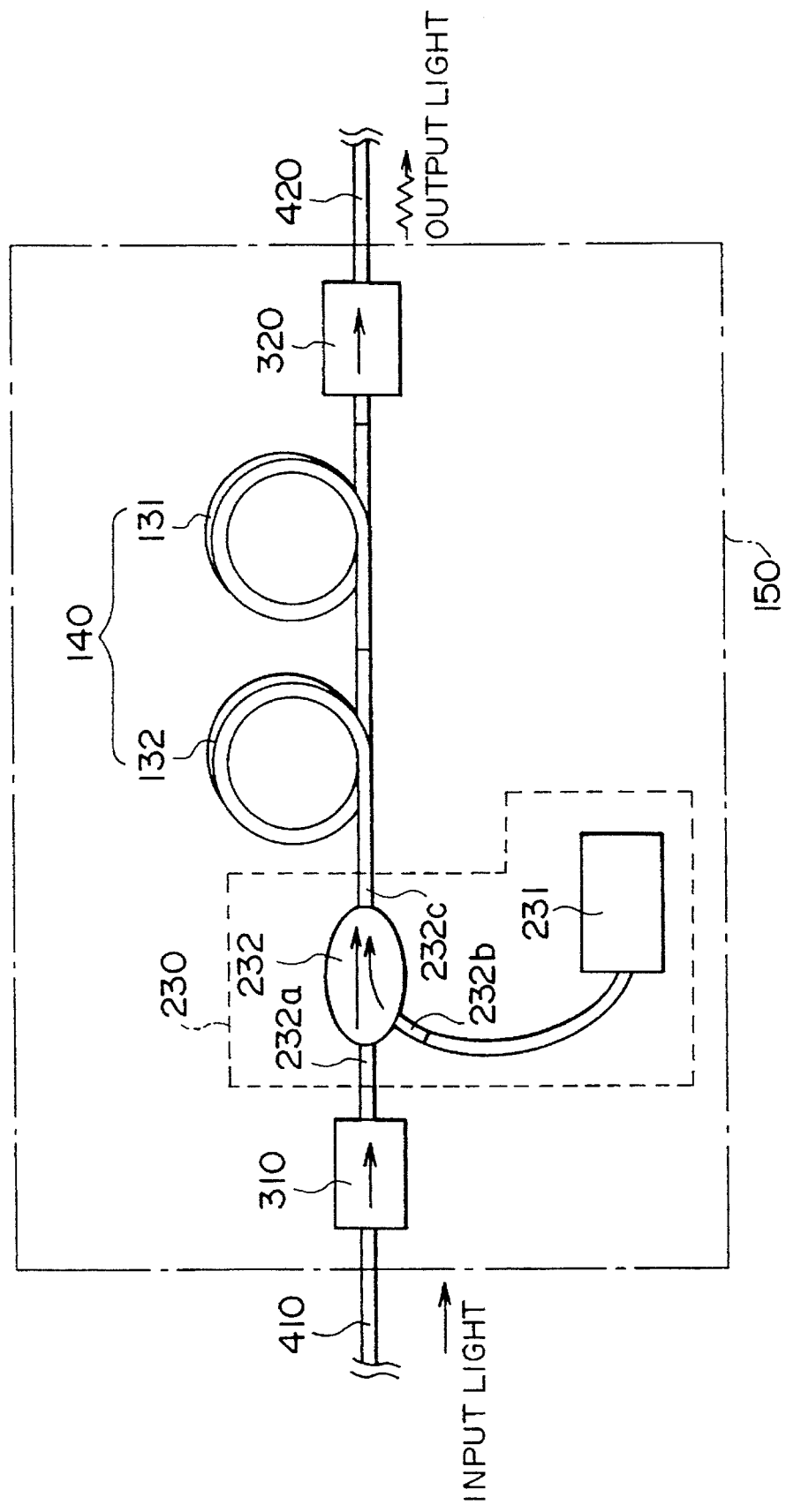
FIG. 24 is a view showing a configuration of an optical amplifier repeater of the sixth embodiment of the present invention.

FIG. 24 shows a configuration of an optical fiber amplifier of the present invention. As shown in FIG. 22, the optical amplifier repeater comprises an optical fiber amplifier 150, as similar to the fifth embodiment, receives signal light through a transmitting optical fiber 410, amplifies the signal light, and emits the amplified signal light to a transmitting optical fiber 420. The optical fiber amplifier 150 has the same configuration as the optical fiber amplifier 100 in the third embodiment except that a composite optical fiber 140 in which the arrangement order of an optical fiber 131 and an optical fiber 132 is opposite is used.

FIG. 25 is a graph showing a characteristic of a span loss in the case that the optical amplifier repeater of the present embodiment is used in the multistage relay transmission line. Note that a characteristic of an optical fiber of which the total Er loss is 80 dB and which has the same composition as the optical fiber 131, a characteristic of an optical fiber of which the total Er loss is 80 dB and which has the same composition as the optical fiber 132, and a characteristic of the third embodiment are also shown in FIG. 25 for comparison. It is seen from the comparison in the graph of FIG. 25 that the dependency of the wavelength at the gain peak of the composite optical fiber 140 due to the span loss is a variation of the dependency of the wavelength at the gain peak of the single optical fiber due to the span loss. It is also seen that as the arrangement order of the optical fibers in the composite optical fiber is changed, the dependency of the wavelength at the gain peak due to span loss is varied.

In this optical fiber amplifier, Er in the composite optical fiber 140 is excited with excitation light supplied from the excitation device 230, and both the optical fiber 131 and the optical fiber 132 are set in a ready state for amplifying input signal light. With this state, when signal light (1.5 μm band) is incident on the composite optical fiber 140 through the optical isolator 310 and the directional coupler 232, first the signal light is amplified by induced emission from the excited Er in the optical fiber 132. At the same time as the amplification of the signal light, light is generated due to spontaneous emission and the generated light together with the induced emission light is incident on the optical fiber 131. The light incident on the optical fiber 131 is amplified by the induced emission from the excited Er in the optical fiber 131. At the same time as the amplification of the light, light is generated due to spontaneous emission and the generated light together with the induced emission light emerges from the composite optical fiber 140. Light emerged from the composite optical fiber 140 is amplified through the optical isolator 320 so as to have the amplification property that the wavelength at the gain peak is determined in accordance with the dependence on the span loss as shown in FIG. 25, and then becomes output light of the optical amplifier repeater.

In the present embodiment, the forward pumping is employed as a method for supplying excitation light but the backward pumping and the bidirectional pumping can be employed, by which the wavelength dependency of the composite optical fiber 140 can also be set different from the wavelength dependency of the optical fiber 131 or the optical fiber 132.

Note that in the third embodiment and the fourth embodiment, the amplifying optical fibers of which the total Er losses are substantially the same are used but the ratio of the total Er losses can arbitrarily be set. Further, the composition of the amplifying optical fiber is not limited to the above and also the amplifying optical fibers constituting the composite optical fiber are not limited to the two kinds. As the ratio of the total Er losses, the composition of the optical fiber for amplifier, or the number of kinds of the amplifying optical fiber is controlled, optical amplifier repeaters with various relations of the span loss and the wavelength at the gain peak can be achieved.

Thus, as described above, according to an optical fiber amplifier of the present invention, a composite optical fiber in which amplifying optical fibers with different compositions are serially coupled is used for amplification, so that an optical fiber amplifier in which wavelength dependency of gain is reduced, and an optical fiber amplifier in which a wavelength at a gain peak is precisely controlled can be achieved.

Further, according to an optical amplifier repeater of the present invention, an optical fiber amplifier of the present invention in which a wavelength at a gain peak is precisely controlled is used, so that an optical amplifier repeater in which a wavelength of signal light becomes a wavelength at a gain peak in accordance with a span loss due to the location of the optical amplifier repeater during formation of the transmission line can be achieved, and a multistage relay transmission line in which signal light is appropriately filtered can be constructed.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 5-293440 filed on Nov. 24, 1993 is hereby incorporated by reference.

What is claimed is:

1. An optical amplifier comprising:

a first fiber having Er and Al doped therein, with no P being doped therein, said first fiber having a first end and a second end;

a second fiber having Er, Al, and P doped therein, said second fiber having a first end and a second end, said first end of said second fiber being optically coupled to said second end of said first fiber, said second fiber having a different concentration of Al than does said first fiber; and a light source for emitting an excitation light that can excite Er, said light source being optically coupled to said second end of said second fiber, said Er in said first and second fibers being excited when said excitation light passes therethrough.

2. An optical amplifier comprising:

a first fiber being doped with Er, and not being doped with P, having a first end and a second end;

a second optical fiber being doped with Er and P, said second fiber having a first end and a second end, with the first end of the second fiber being optically coupled to the second end of said first fiber; and only one light source for emitting an excitation light that can excite said Er, said light source being optically coupled to at least one of said first and second fibers.

3. An optical amplifier comprising:

a first fiber having Er doped therein but having no Al doped therein, said first fiber having a first end and a second end;

a second fiber having Er and Al doped therein, said second fiber having a first end and a second end, with the first end of said second fiber being optically coupled to said second end of said first fiber; and only one light source for emitting an excitation light that can excite said Er, said light source being optically coupled to at least one of said first and second fibers.

4. An optical amplifier comprising:

a first fiber having Er an Al doped therein, said first fiber having a first end and a second end;

a second fiber having Er and Al doped therein, said second fiber having a first end and a second end, with the first end of said second fiber being optically coupled to said second end of said first fiber, wherein concentrations of Al in said first and second fibers are different; and only one light source for emitting an excitation light that can excite Er, said light source being optically coupled to said second end of said second fiber.

5. An optical amplifier comprising:

a first fiber having Er and Al doped therein, said first fiber having a first end and a second end;

a second fiber having Er and Al doped therein, said second fiber having a first end and a second end, said second fiber having a different concentration; and only one light source for emitting an excitation light that can excite Er, said light source being optically coupled to said second end of said second fiber, with Er in said first and second fibers being excited only when the excitation light passes therethrough.

6. An optical amplifier comprising:

a first fiber having Er and Al doped therein, said first fiber having a first end and a second end;

a second fiber having Er and Al doped therein, said second fiber having a first end and a second end, with the first end of said second fiber being in contact with said second end of said first fiber, wherein a concentration of Al in said second fiber differs from a concentration of Al in said first fiber; and only one light source for emitting an excitation light that can excite Er, said light source being optically coupled to the second end of said second fiber.

7. An amplifier according to claim 1, wherein said first fiber has Al doped therein in a range of from 0.2 wt % to 3.0 wt %.

8. An optical amplifier system comprising said amplifier according to claim 1.

9. An optical amplifier system comprising said amplifier according to claim 2.

10. An optical amplifier system comprising said amplifier according to claim 3.

11. An optical amplifier system comprising said amplifier according to claim 4.

12. An optical amplifier system comprising said amplifier according to claim 5.

13. An optical amplifier system comprising said amplifier according to claim 6.

* * * * *